US009802809B1

(12) United States Patent
Schultz, Jr. et al.

(10) Patent No.: US 9,802,809 B1
(45) Date of Patent: Oct. 31, 2017

(54) FLUID TRANSFER DEVICE WITH PRESSURE EQUILIBRIUM VALVE

(71) Applicant: SCHULTZ ENGINEERED PRODUCTS, INC., Neptune, NJ (US)

(72) Inventors: Robert L. Schultz, Jr., Ocean, NJ (US); Alexander G. Murashko, Jr., Shrewsbury, NJ (US)

( * ) Notice: Subject to any disclaimer, the term of this patent is extended or adjusted under 35 U.S.C. 154(b) by 0 days.

(21) Appl. No.: 14/999,548

(22) Filed: May 23, 2016

Related U.S. Application Data

(63) Continuation-in-part of application No. 13/999,185, filed on Jan. 27, 2014, now Pat. No. 9,346,663.

(51) Int. Cl.
| | |
|---|---|
| *B67D 7/54* | (2010.01) |
| *B65D 25/48* | (2006.01) |
| *F16L 29/04* | (2006.01) |
| *B67D 7/04* | (2010.01) |
| *B60K 15/03* | (2006.01) |

(52) U.S. Cl.
CPC ............ *B67D 7/54* (2013.01); *B65D 25/48* (2013.01); *B67D 7/0478* (2013.01); *F16L 29/04* (2013.01); *B60K 2015/03335* (2013.01)

(58) Field of Classification Search
CPC ...... B67D 7/0478; B67D 7/0476; B67D 7/42; B67D 7/54; F16L 29/04
USPC ............... 141/59, 293–295, 347; 251/149.1; 137/614.03, 614.04, 614.05
See application file for complete search history.

(56) References Cited

U.S. PATENT DOCUMENTS

| | | | |
|---|---|---|---|
| 2,507,680 A | 1/1950 | Rheude | 215/303 |
| 3,125,135 A | 3/1964 | Boyer et al. | 141/290 |
| 3,126,728 A | 3/1964 | Nehls | 70/169 |
| 3,513,887 A | 5/1970 | Limandri | 141/207 |

(Continued)

OTHER PUBLICATIONS

U.S. Appl. No. 11/702,414, Jul. 10, 2008, U.S. Office Action.
(Continued)

*Primary Examiner* — Timothy L Maust
*Assistant Examiner* — Timothy P Kelly
(74) *Attorney, Agent, or Firm* — Chris Whewell

(57) ABSTRACT

Complementary couplers useful in providing a coupling through which liquids may be transferred from a first storage reservoir or tank to a second storage reservoir or tank, which can be an on-board fuel tank of a motorized vehicle. There is a first coupling which is configured to be in fluid communication with the interior of a receiving vessel, fuel tank, etc. and a second coupling which is intended to be in fluid communication with the contents of a storage reservoir containing a chemical, liquid fuel, etc. The disclosure also includes a process for charging a fuel reservoir on board of a motorized vehicle from a remote reservoir, wherein the vapor in the fuel reservoir is displaced by an equal volume of fuel delivered from said remote reservoir, and wherein the vapor in said fuel reservoir is simultaneously caused to be transferred to said remote reservoir, thus permitting no escape of the vapor from said fuel reservoir to the surrounding atmosphere. Through use of the present disclosure, more rapid liquid transfer through individual couplers occurs with reduced losses of liquid chemicals, fuel, etc. versus prior art couplers. A remote reservoir useful for recharging fuel to a motorized vehicle, having a two way pressure equilibrium valve is also provided.

9 Claims, 38 Drawing Sheets

(56) References Cited

U.S. PATENT DOCUMENTS

| | | | |
|---|---|---|---|
| 3,517,848 A | 6/1970 | Ermer, Jr. et al. | 215/330 |
| 3,851,852 A | 12/1974 | Blanchard et al. | 251/149.1 |
| 3,874,410 A | 4/1975 | Clark | 137/614 |
| 4,266,574 A | 5/1981 | Tilling | 137/630.19 |
| 4,294,376 A | 10/1981 | Keller | 220/318 |
| 4,328,844 A | 5/1982 | Becktel et al. | 141/302 |
| 4,376,492 A | 3/1983 | Bartel et al. | 220/210 |
| 5,040,577 A | 8/1991 | Pope | 151/59 |
| 5,405,120 A | 4/1995 | Kerpan et al. | 251/149.9 |
| 5,429,155 A | 7/1995 | Brzyski et al. | 137/614.04 |
| RE35,238 E | 5/1996 | Pope | 141/59 |
| 5,567,126 A | 10/1996 | Meece | 141/59 |
| 5,634,505 A | 6/1997 | Wong | 141/349 |
| 5,640,993 A * | 6/1997 | Kasugai | B60K 15/03519 123/519 |
| 5,845,800 A | 12/1998 | Shaw et al. | 220/210 |
| 6,079,444 A | 6/2000 | Harris et al. | 137/614.03 |
| 6,149,129 A | 11/2000 | Harris et al. | 251/149.1 |
| 6,167,747 B1 | 1/2001 | Koch et al. | 141/59 |
| 6,170,522 B1 | 1/2001 | Tanida | 137/614.02 |
| 6,209,745 B1 | 4/2001 | Jansson | 220/288 |
| 6,223,923 B1 | 5/2001 | Fishman | 220/210 |
| 6,240,982 B1 | 6/2001 | Bonne | 141/59 |
| 6,250,348 B1 | 6/2001 | Reinholdt | 141/382 |
| 6,418,981 B1 | 7/2002 | Nitecki et al. | 141/59 |
| 6,675,841 B2 | 1/2004 | Burns | 141/59 |
| 6,899,149 B1 | 5/2005 | Hartsell et al. | 141/59 |
| 6,941,978 B2 | 9/2005 | Riffle | 141/59 |
| 7,048,020 B2 | 5/2006 | Durieux et al. | 141/382 |
| 7,182,098 B2 | 2/2007 | Tilling et al. | 137/614.03 |
| 7,546,857 B2 | 6/2009 | Chadbourne et al. | 141/354 |
| 7,644,902 B1 | 1/2010 | Julian et al. | 248/313 |
| 7,798,184 B2 | 9/2010 | Schultz, Jr. et al. | 141/59 |
| 8,235,079 B2 | 8/2012 | Schultz, Jr. | 141/350 |
| 8,453,685 B2 | 6/2013 | Schultz, Jr. et al. | 141/59 |
| 9,346,663 B1 * | 5/2016 | Schultz, Jr. | B67D 7/54 |
| 2013/0263970 A1 | 10/2013 | Schultz, Jr. | 141/301 |

OTHER PUBLICATIONS

U.S. Appl. No. 12/287,508, Nov. 20, 2009, U.S. Office Action.
U.S. Appl. No. 12/806,903, Oct. 18, 2012, U.S. Office Action.
U.S. Appl. No. 13/134,985, Apr. 27, 2012, U.S. Office Action.

* cited by examiner

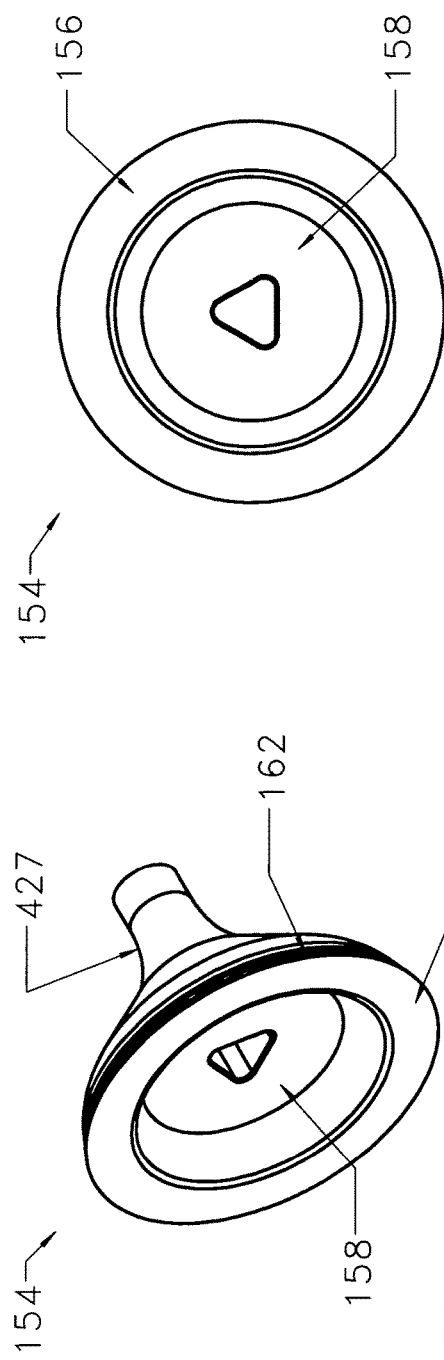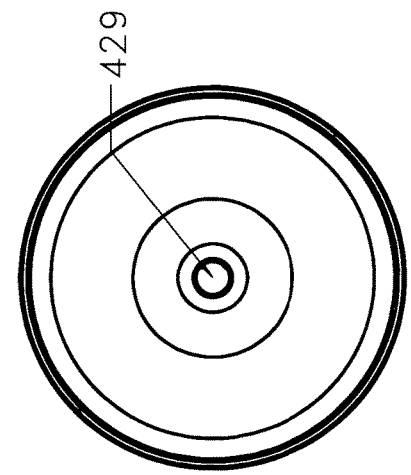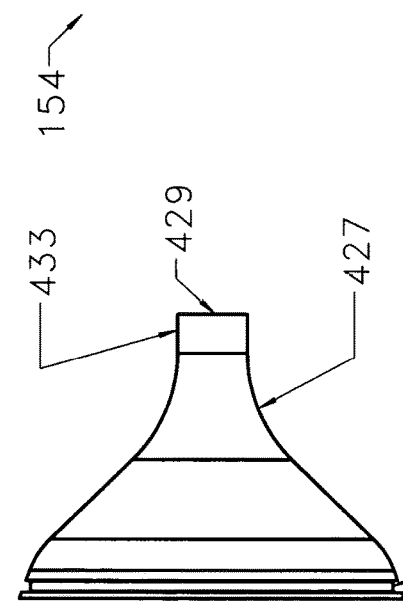

FLUID TRANSFER DEVICE WITH PRESSURE EQUILIBRIUM VALVE

TECHNICAL FIELD

This disclosure relates generally to fluid control and more particularly to couplings used in transferring a liquid substance from one reservoir in which a liquid is stored to a second reservoir. In some embodiments the invention relates to couplings useful in transferring a liquid hydrocarbon fuel from a storage vessel to a fuel tank on-board a motorized vehicle, such as an automobile, truck, aircraft, sea-going vessels and heavy equipment.

BACKGROUND

By the very nature of the utilization of liquid substances including noxious chemicals, liquid hydrocarbon fuels, sulfide liquors, and any other objectionable or hazardous chemical material, it is frequently necessary to transfer a liquid fuel from a first storage vessel in which it is contained to a second storage vessel. Some instances include inter-plant transfers of liquids and gases in chemical plants, loading and off-loading tanker trucks and rail tankers, the re-fueling of aircraft, etc. Another instance in which it is necessary to so transfer a liquid fuel is in the case of re-fueling an automobile, including race cars during a racing event.

One particular class of automobile racing requires competing vehicles to travel an extended period of time to cover the pre-determined distance of the race. Such automobile races are popular and current NASCAR and other events include such races as the Indianapolis 500, the California 500, the Virginia 500, and the New England 300. Such automobile races typically require drivers and their cars to travel hundreds of miles from start to finish.

Since the fuel-carrying capacity of a race car is limited by the rules of racing and the capacity of such tanks is not sufficient to enable the racer to complete an entire race on a single tank load of fuel, it is a general requirement that drivers must take pit stops periodically for re-fueling. The amount of time used by a racing team for combined maintenance operations including re-fueling is usually a significant factor in determining the outcome of a given race. Hence, it is highly desirable from the standpoint of a racing team that time expended in re-fueling and other pit-stop operations is kept to an absolute minimum.

Current state-of-the-art for re-fueling a racing vehicle in a circle-track application is for the racer to pull their car into a "pit-stop" for servicing. As is customary, the on-board fuel tank of a racing vehicle includes an inlet conduit through which fuel is admitted to the on-board fuel tank during re-fueling. The prior art also uses a cap or other means of sealing the inlet conduit from the surrounding environment after a re-fueling of the vehicle is complete.

During a re-fueling, members of the pit crew tote a large funnel-shaped recharging tank or "dump can" which contains a desired amount of a motor fuel, about 11.5 US gallons in the case of some racing events. The recharging tank includes a fitting on its lower extremity which is complementary to that on the end of the inlet conduit on the vehicle's fuel tank. Once the vehicle comes to a stop, the pit crew removes the cap from the fuel tank inlet. Then, the fitting on the recharging tank is mated to the fitting on the tank inlet to form a sealed conduit through which fuel may pass from the recharging tank to the vehicle's on-board fuel tank, thus providing a fluid transfer coupling. A valve disposed on the recharging tank is opened, and fuel contained within the recharging tank is drawn by gravity into the on-board fuel tank of the vehicle. A headspace volume exists above the liquid level of the fuel in the tank, and initially when the tank is full, the headspace volume is at its minimum. As fuel is consumed, the headspace volume increases, and reaches its maximum when all of the liquid fuel formerly contained in the tank has been consumed.

The re-fueling of a racing vehicle is undertaken as expediently as possible while minimizing fuel loss during the operation. However, one disadvantage of prior art methods and fluid transfer couplings is that significant volumes of liquid fuel are spilled onto the pavement and portions of the vehicle being re-fueled upon de-coupling of the fluid transfer coupling's mating halves from one another. A volume of fuel lost by spillage in re-fueling operations during the course of a race can be several gallons, such losses occurring primarily when the recharging tank is removed from the inlet conduit on the receiving vessel. While pit crews are well-equipped to deal with inadvertent fires that may occasionally occur, there are immediate health risks to pit crew personnel other than the fire hazard. For example, modern racing engines are typically designed to require fuels having high octane ratings. Volatile anti-knock compounds such as tetraethyl lead and the like are sometimes formulated into racing fuels as octane boosters. These lead compounds are volatile and since they are known health hazards, the issues of inhalation and transdermal absorption of tetraethyl lead and related compounds may possibly pose a serious threat to health. In addition, any un-necessary release of raw hydrocarbon fuels into the atmosphere is of concern for environmental reasons.

Another issue concerning storage tanks is the concept of vapor lock. Vapor lock is a condition manifest by the pressure in the headspace above the fuel in a storage tank being lower than normal atmospheric pressure. In the case of automobiles, such a condition is caused to exist by virtue of the fuel pump removing fuel from the fuel tank, without the same volume of air being admitted into the tank to compensate for the lost volume of fuel owing to the fuel tank being sealed off from the atmosphere. Eventually, the fuel pump is required to pump fuel from an area of reduced pressure, and, not being designed for such use, a less-than-desired amount of fuel is delivered to the engine, which can result in decreased engine performance.

SUMMARY

Provided are couplers useful for facilitating transfer of a liquid from a first vessel to a second vessel with counter-current transfer of vapor from the second vessel to the first vessel. In some embodiments a coupler as provided comprises a spring-biased quasi-cylindrical sleeve that is slidably disposed within a cover. The sleeve is hollow, has an interior and an exterior wall surface, and the exterior wall is configured sufficiently to cause upon application of force against the pressure of the spring, the opening of a first passage through which liquid is able to pass, and the opening of a second passage that is separate and distinct from said first passage through which vapor is able to pass within the coupler. In some embodiments a coupler as provided herein is configured so that the second passage opens prior to the opening of the first passage. The first passage is disposed through the interior of the sleeve and the second passage is disposed exterior to the wall of the sleeve, with the exterior wall surface of the sleeve comprising at least a portion of the boundary of the second passage.

BRIEF DESCRIPTION OF THE DRAWINGS

In the annexed drawings:

FIG. 38 shows an overhead perspective view of a poppet according to some embodiments of the invention;

FIG. 39 shows a top view of a poppet according to some embodiments of the invention;

FIG. 40 shows a side view of a poppet according to some embodiments of the invention;

FIG. 41 shows a bottom view of a poppet according to some embodiments of the invention;

DETAILED DESCRIPTION

A fuel transfer coupling according to some embodiments of this disclosure comprises a first portion at a first location selected by the user that is in fluid communication with a receiving vessel. There is a remote portion of the coupling disposed at a second location selected by the user, the remote portion being in selective fluid communication with a source of liquid hydrocarbon, chemical, fuel, etc. that is to be transferred, delivered or provided, etc. to the receiving vessel to which the first portion is in fluid communication. The material can be dispensed through couplings provided herein to vehicles including without limitation: trucks, automobiles, aircraft, sea-going vessels, motorcycles, and other heavy equipment.

In some embodiments a coupling as provided herein is used in transferring a fluid to a receiving vessel that is not on board of a motorized vehicle, such as transfers of any chemical including hydrocarbons from one storage vessel to another storage vessel, for example in a chemical plant wherein the first portion of a coupling as provided herein is attached to a first end of a segment or line of conduit including hoses and pipes, and the second portion of a coupling as provided herein is attached to the second end of that same conduit line or segment. Other embodiments include a standing tank containing a liquid substance having a hose attached to its outlet to which either a male or female coupling portion provided herein is attached.

In some embodiments, the on-board portion may be referred to as the male coupler and the remote portion of the coupling may be referred to as the female coupler for convenience; however, the first portion in fluid communication with the receiving vessel including a fuel tank aboard a motorized vehicle can be selected to have a female configuration, and the second portion in fluid communication with the vessel containing the liquid to be transferred can be selected to have a male configuration.

In some embodiments the fluid that is to be transferred is caused to be under an applied pressure that is greater than ambient pressure by any selected amount to hasten liquid flow, such as by employment of a fluid pump.

Figure 1:
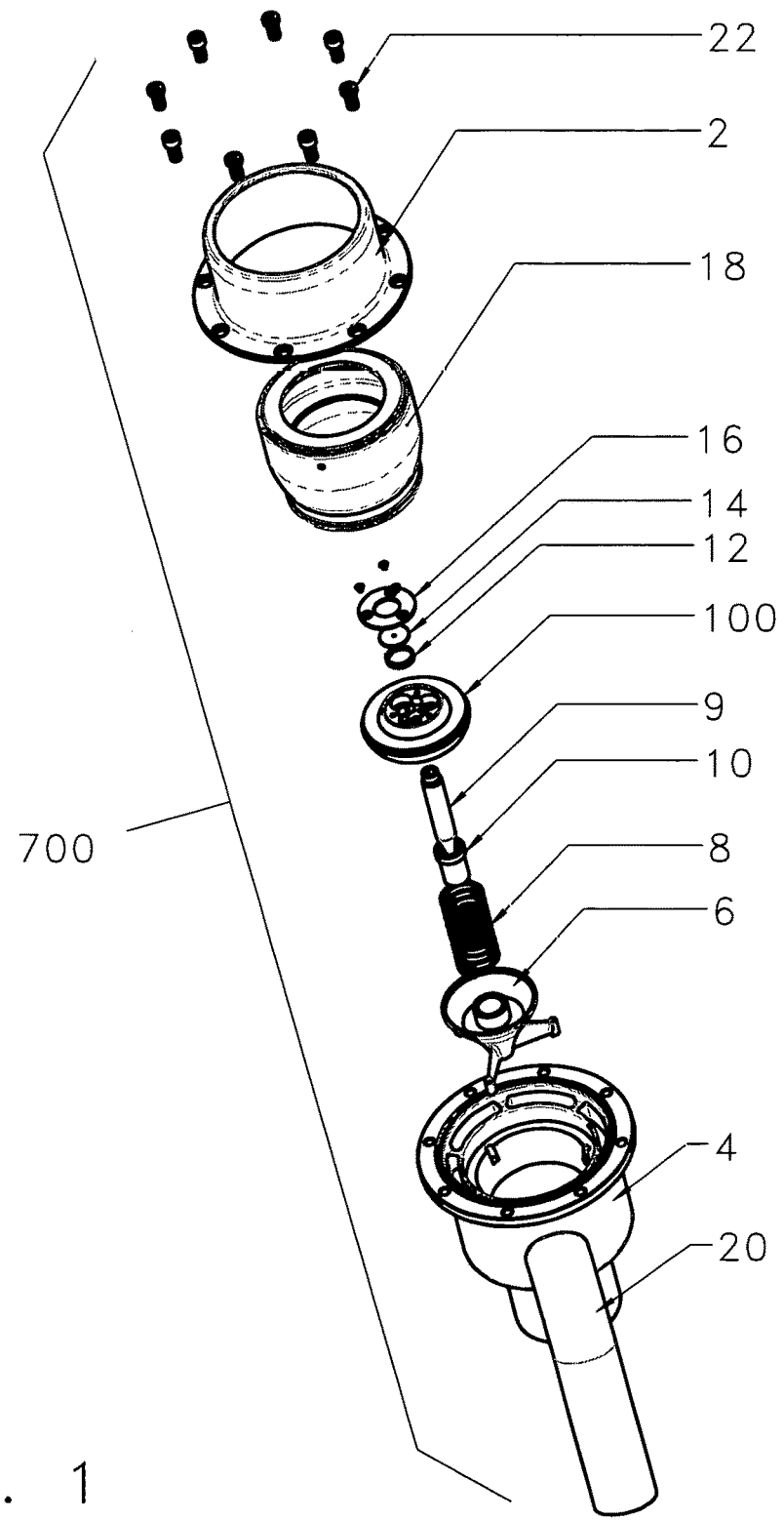
FIG. 1 shows an exploded perspective view of a coupler according to some embodiments of the invention.

Referring to the drawings, and initially to FIG. 1 there is shown an exploded view of a coupler 700 according to some embodiments with its various components, including vapor tube 20, male coupler base 4, conical poppet guide 6, spring 8, poppet bushing 10, poppet shaft 9, poppet 100, vent spring 12, vent disc 14, retainer ring 16, sleeve 18, male coupler cover 2, and fasteners 22.

Figure 2:
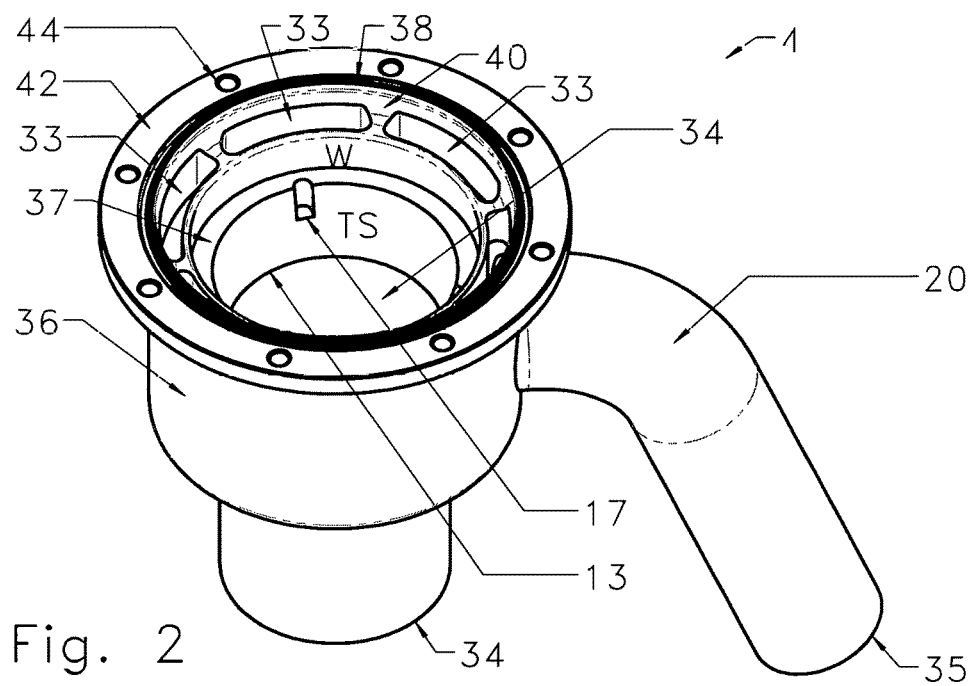
FIG. 2 shows a perspective view of a coupler base according to some embodiments of the invention.

In FIG. 2 is shown a perspective view of male coupler base 4, which includes a central bore 34 through which a liquid substance such as a normally-liquid hydrocarbon fuel or other selected fluid material is intended to flow. Central bore 34 has a first end 39 (FIG. 16) which may be connected to the inlet pipe of a fuel tank, and a second end portion which extends into and terminates at a point within the male coupler base as shown, for some embodiments. In some embodiments the cross section of central bore 34 is circular throughout its length; however other cross-sectional geometries can be selected, including oval and any other known suitable geometry. Disposed about central bore 34 is a shrouding enclosure 36 which comprises a chamber disposed co-axially about central bore 34. Shrouding enclosure 36 provides a pathway for any vaporous substance such as hydrocarbon or chemical vapors, gases, air, water vapor, etc. to pass through the various holes 33 disposed through surface 40 of the male coupler base as shown. Holes 33 are in fluid communication with the outlet portion 35 of the vapor tube 20 via enclosure 36. In some embodiments holes 33 are shaped as slots or oblong, ovoid, and in other embodiments holes 33 are circular or rectangular, and in some embodiments surface 40 is planar. Any suitable geometry may be selected among cooperating component parts or elements of combinations described in this disclosure provided the functionality as taught herein is preserved. The functional outlet of male coupler base 4 comprises various holes 33, and its inlet is vapor tube 20 when this coupler is attached to a liquid-receiving vessel. Flange 42 is disposed at one end of base 4 having a plurality of holes 44 disposed therethrough along its periphery for the purpose of receiving fasteners for affixing coupler base 4 to other components of coupler 700 including cover 2. In some embodiments, holes 33 are present through surface 40, which surface 40 is disposed on a plane substantially parallel to but different from and beneath that of the planar surface of flange 42. In some embodiments the plane of the flange portion 42 is above (more distal from the first end 39 of central bore 34 than surface 40) than of the surface 40. In some embodiments at the terminus of central bore 34 there is a ledge 37 which can be flat featuring a beveled or non-beveled edge and an adjacent wall W. Wall W is cylindrical in some embodiments and extends to surface 40. In some embodiments an annular lip is present at elevation 38, upon which an o-ring seal 46 is mounted (not shown) in the finished assembly. In some embodiments there is within coupler base 4 a circumferential ledge 37 disposed adjacent to cylindrically-shaped wall W, and inside wall W is slidably disposed a circular skirt 55 (FIG. 7) portion of sleeve 18. Skirt 55 is dimensioned to enable a seal to exist (o-ring present in groove 511) between the inner portion of central bore 34 where liquid passes and the interior of shrouding enclosure 36 in which vapors pass. Any known functionally-equivalent seals can be employed on various elements of a combination described herein, when proceeding according to this disclosure.

In some embodiments the travel of sleeve 18 within base 4 during coupling or uncoupling of the couplings herein is limited by the location of ledge 37 within coupler base 4, which ledge acts as a stop for motion of sleeve 18 into coupler base 4. Slots 17 in the wall of central bore 34 at its terminus at ledge 37 within coupler base 4 are provided for receiving contact features 62 (FIG. 9) slidably inserted therein (FIGS. 9-11) during assembly of the unit, to maintain poppet guide 6 in position. In some embodiments, the opening of central bore 34 at bottom 13 of tapered segment TS is smaller in diameter than the bore at the innermost diameter of circumferential ledge 37, thus providing a tapered segment TS of the central bore 34. In some embodiments when the degree of this taper is dimensioned sufficiently a smooth transition is provided in the conduit through which liquid material passes though couplers according to this disclosure. In some embodiments, disposed upstream of tapered segment TS is the opening at the bottom B of sleeve 18 that leads to the interior of sleeve 18. In some embodiments, disposed downstream of tapered segment TS is the interior of central bore 34. In some embodiments the inner diameter of central bore 34 is slightly smaller than the opening at the bottom B of sleeve 18 that leads to the interior of sleeve 18.

Figure 48:
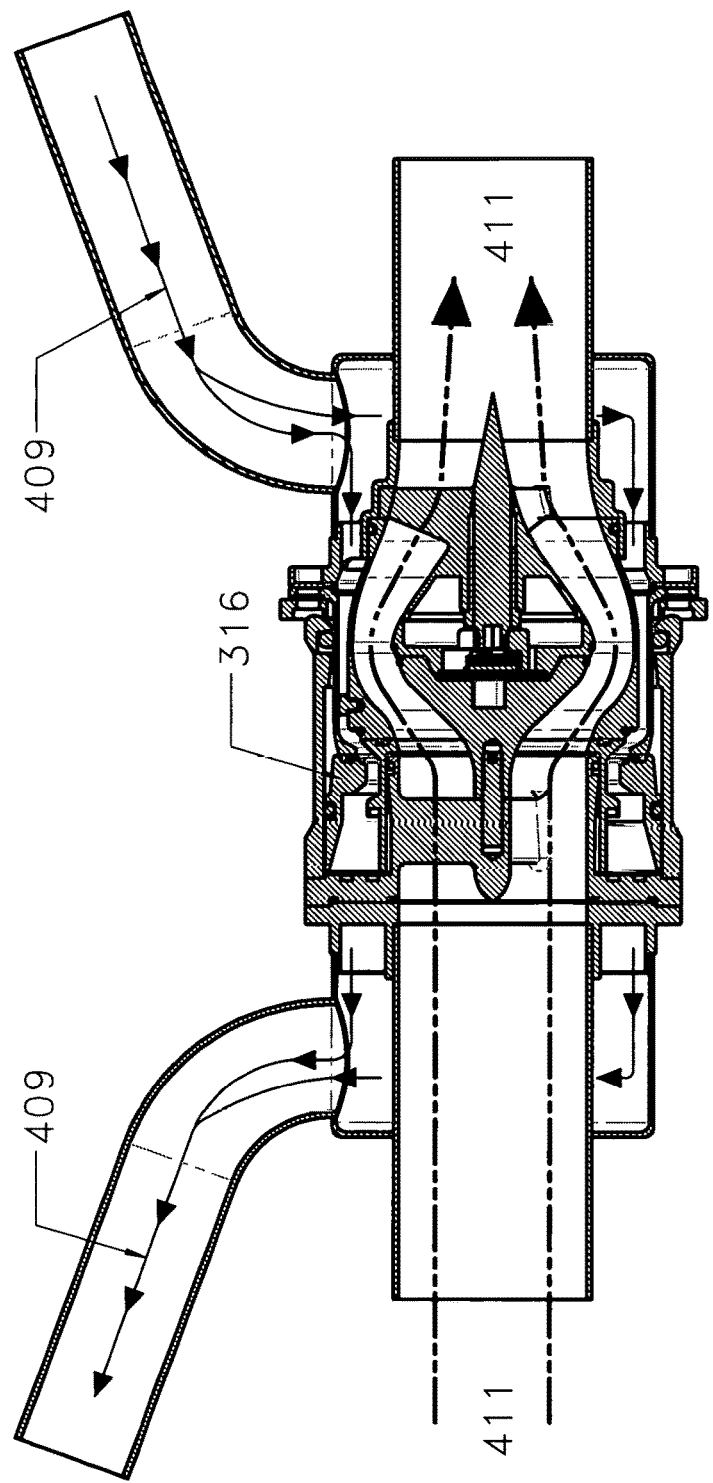
FIG. 48 shows a side cutaway view of the couplers depicted in FIGS. 46, 47 complementarily connected to one another.

In some embodiments when sleeve 18 is depressed so that it is in an open position such as depicted in FIG. 48, the bottom of skirt 55 of sleeve 18 resides against ledge 37. In some embodiments coupler base 4 includes a smooth transition in diameter between the contour of the interior wall surface of central bore 34 downstream and adjacent to the opening at bottom 13 of tapered segment TS and the interior wall surface of sleeve 18, when sleeve 18 is in such open position. The smooth transition includes tapered segment TS corresponding to the wall of central bore 34 disposed between the opening at bottom 13 and the innermost edge of ledge 37. In some embodiments, the degree of taper is sufficient to provide a smooth transition in diameter between the inner wall of sleeve 18 at bottom B and the inner diameter of central bore 34 that is downstream of bottom 13 of tapered segment TS with respect to liquid flow. In some embodiments central bore 34 comprises a section of pipe or tubing.

Figure 3:
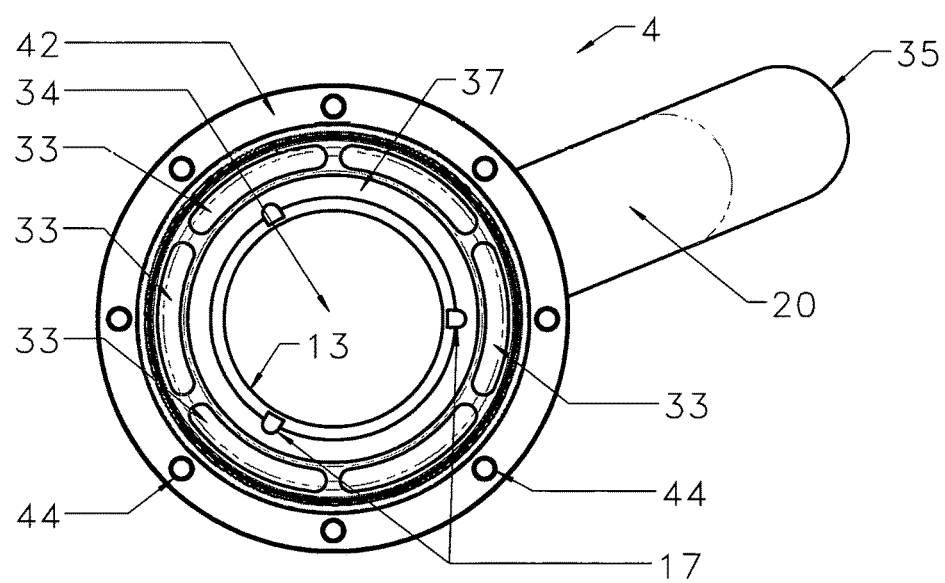
FIG. 3 shows an overhead view of a coupler base according to some embodiments of the invention.

In FIG. 3 is shown an overhead view of male coupler base 4, including central bore 34, flange 42, holes 44, vapor tube 20, holes 33, circumferential ledge 37, bottom 13 of tapered segment and slots 17. An o-ring seal 46 is present at the elevation 38 shown in FIG. 2.

Figure 4:
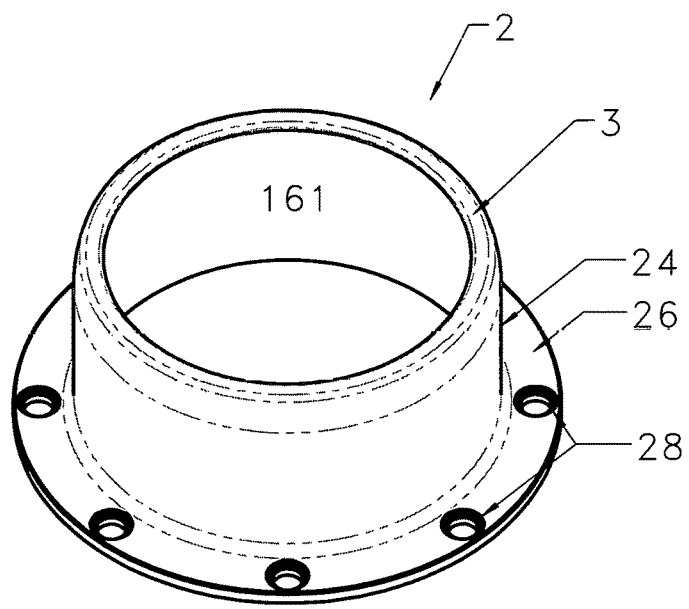
FIG. 4 shows a perspective view of a cover component of a coupler according to some embodiments of the invention.
Figure 5:
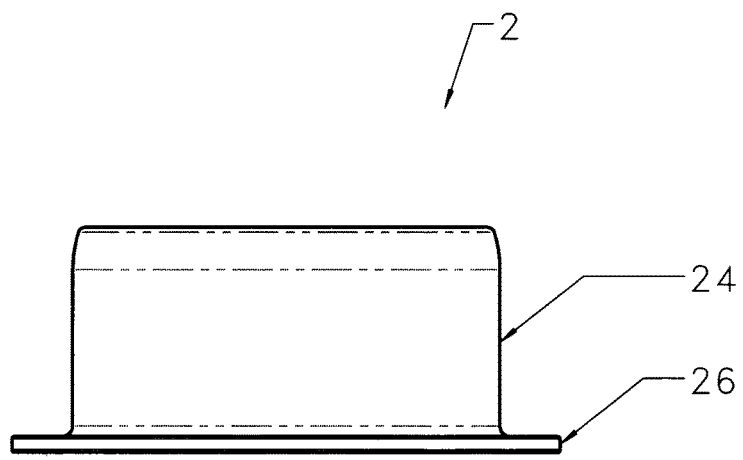
FIG. 5 shows a side view of a cover component of a coupler according to some embodiments of the invention.

FIG. 4 shows a perspective view of the male coupler cover 2, having an outer wall 24, top surface 3, and flange 26 which includes a plurality of holes 28 disposed about its periphery for connection to the male coupler base 4 once all components of coupler 700 have been assembled and installed within coupler base 4, using conventional fasteners in some embodiments including screws. Also shown is inner wall 161. In FIG. 5 is shown a side view of male coupler cover 2, including outer wall 24 and flange 26.

Figure 6:
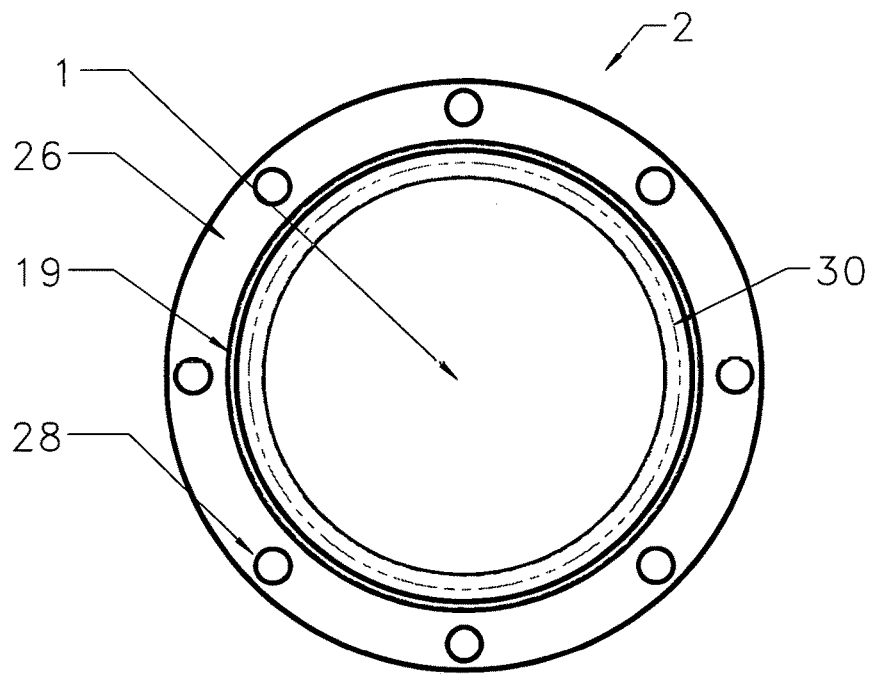
FIG. 6 shows a bottom perspective view of a cover component of a coupler according to some embodiments of the invention.

FIG. 6 shows a bottom view of the male coupler cover 2, including flange 26, plurality of holes 28, annular groove 19 which extends about the hollow interior 1 adjacent to the flange 26 and receives the o-ring seal 46 (not shown) in a sealing relationship in the completed assembly. There is a circumferential beveled edge 30 within the interior of cover 2 that is configured to sealingly engage o-ring 50 present at the exterior of sleeve 18.

Figure 7:
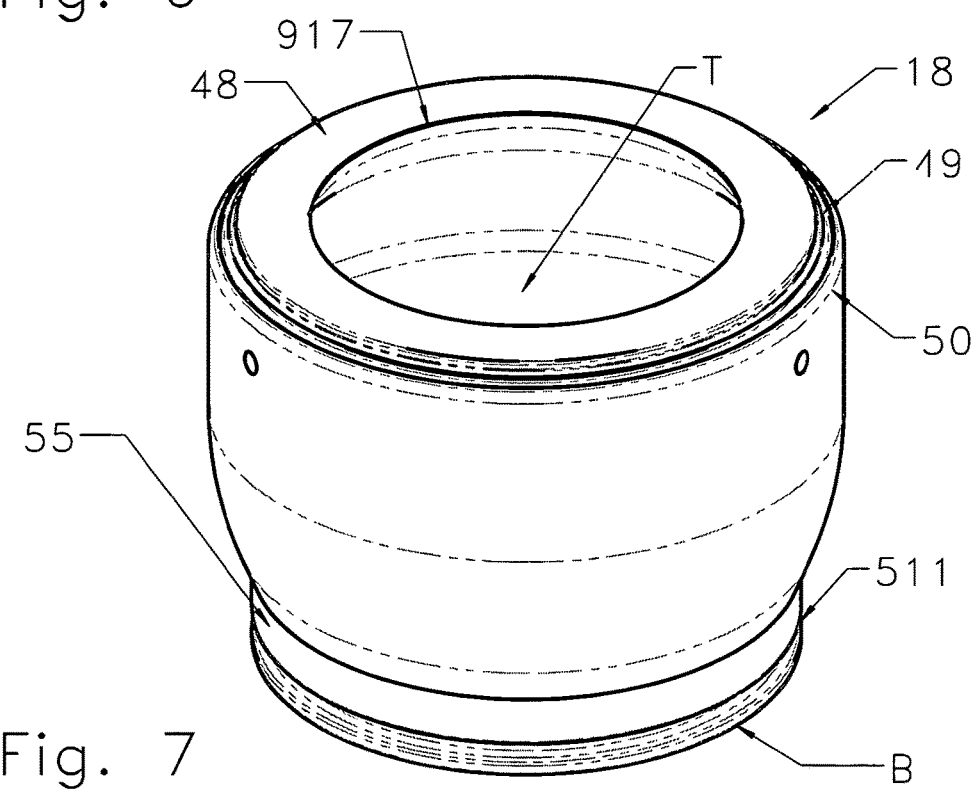
FIG. 7 shows a perspective view of a sleeve component of a coupler according to some embodiments of the invention.

FIG. 7 depicts a perspective view of sleeve 18, which in some embodiments is configured as a quasi-cylindrical hollow shell or sleeve having features shown and described herein. Sleeve 18 is hollow in its interior, as shown in cross-section in FIGS. 46, 48 and has an open top T and an open bottom B. At open top T is seat 917, analogous to seat 399 of inner sleeve 116 (FIG. 31) in that seat 917 is the location at which a selectively-engageable seal is provided between a poppet and the seat, this seal being selectively-engageable depending whether or not force is applied to sleeve 18 that causes it to move one way or the other. In some embodiments, seat 917 is merely a circular inner perimeter of the top surface 48, 401 of a sleeve 18, 116, which can be beveled if desired. A hollow interior space defining a volume is thus present within the confines of the wall and top and bottom of sleeve 18. In some embodiments top surface 48 is flat, and there is a sloping circumferential shoulder portion 49 featuring a ring land in which resides an o-ring seal 50 in the assembled device. O-ring seal 50 is disposed to seal between the sloping shoulder 49 and beveled edge 30 from FIG. 6 previous when the couplers 700, 701 are not coupled to one another. In the assembled coupler 700 there is also an o-ring seal disposed in a circumferential groove 511 present on the skirt of sleeve 18 adjacent to the bottom portion B, for sealing the skirt portion of sleeve 18 against wall W of the bore in FIG. 2 in the assembled device. Thus, the skirt portion of sleeve 18 is slidably disposed within a bore defined by circumferential wall W adjacent to the circumferential ledge 37.

Figure 8:
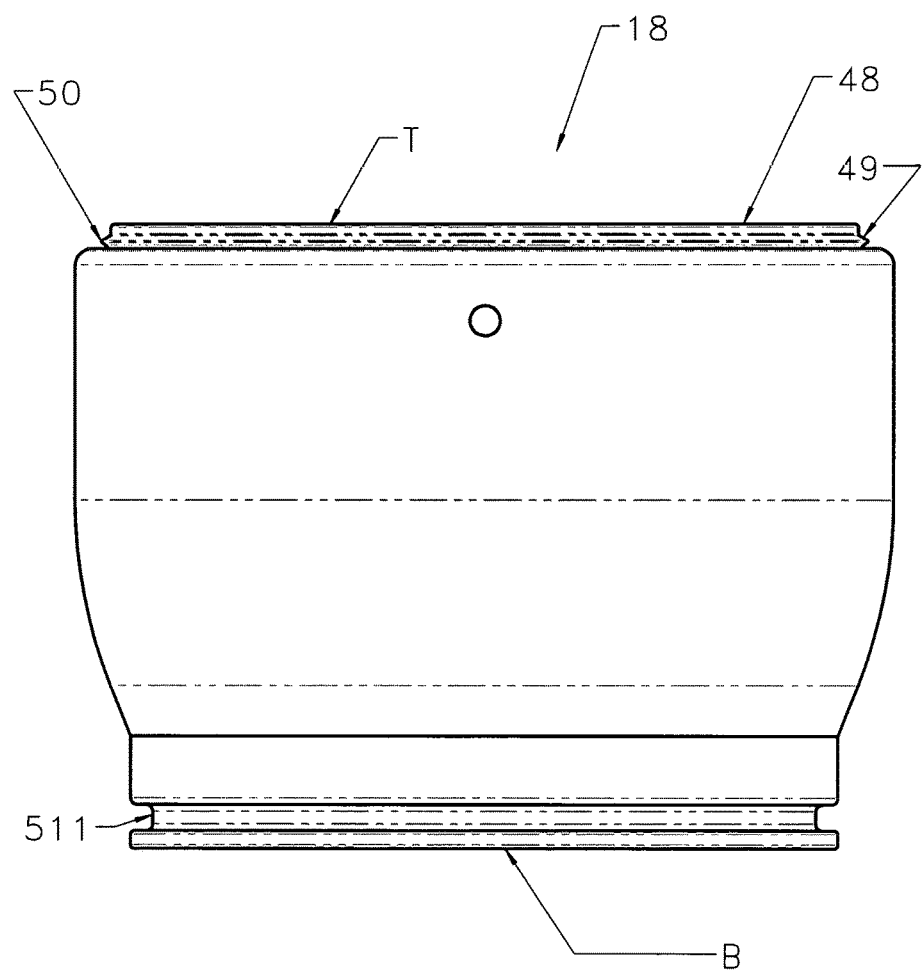
FIG. 8 shows a side view of a sleeve component of a coupler according to some embodiments of the invention.

FIG. 8 shows a side elevation view of a sleeve 18 according to some embodiments and depicts the locations of the top surface 48, sloping shoulder 49, location of o-ring seal 50, and groove 511 for holding an o-ring seal.

Figure 9:
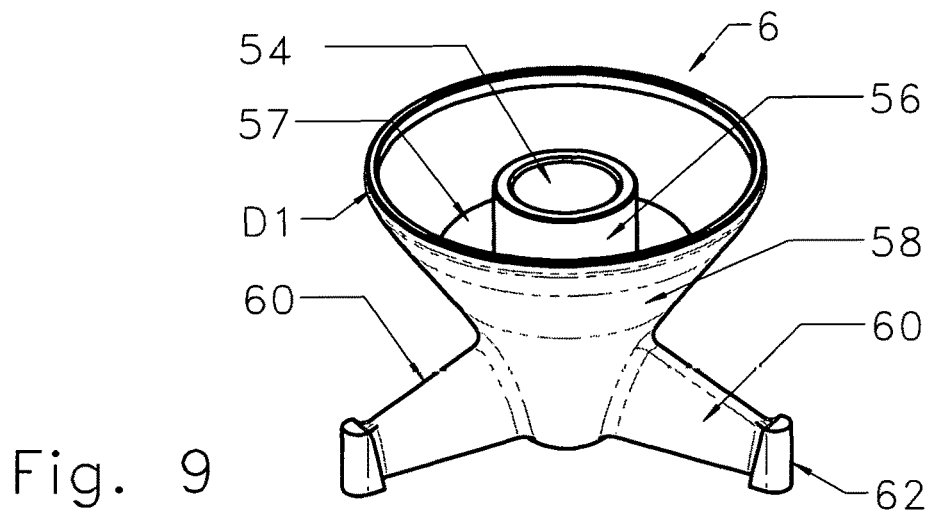
FIG. 9 shows a perspective view of a poppet guide component of a coupler according to some embodiments of the invention.

FIG. 9 shows a perspective view of a poppet guide 6 according to some embodiments, shaped as a truncated cone, which shape synergistically contributes in providing favorable fluid dynamics for liquids passing through a coupling including couplers 700, 701 as taught herein, resulting in low resistance to fluid flow and increased fluid flow rates over prior art. In some embodiments poppet guide 6 a singular construct of a machined metal, alloy, polymer, composite, etc. including a funnel-shaped conical element 58 having a wall thickness, and centrally disposed therein a poppet guide bore 54 having a wall 56 with a wall thickness and a plurality of support arms 60 extending radially from the center of poppet guide 6. In some embodiments there are three support arms 60 as shown, but the present disclosure includes the presence of any effective number of support arms 60 provided corresponding slots 17 are present to accommodate contact features 62 present. In some embodiments support arms 60 include contact features 62 at the ends thereof configured to be complementary to and securely reside within slots 17 present in base 4 (FIGS. 2, 3) at and extending below circumferential ledge 37. In some embodiments contact features 62 are shaped as truncated cylinders, but any suitable functionally-equivalent matching complementary arrangement between contact features 62 and slots 17 can be employed. Poppet guide 6 is rigidly maintained in a stationary position in an assembled coupler partly due to the contact features 62 residing in slots 17.

Poppet guide bore 54 extends all the way through poppet guide 6 and is dimensioned to receive poppet bushing 10 (FIG. 1), which itself is dimensioned to receive poppet shaft 9 such that poppet shaft 9 is slidably disposed within bushing 10, which acts as a guide for movement of poppet shaft 9. The diameter at D1 shown in FIG. 9 at the upper portion of conical element 58 is slightly less than that of the internal diameter of the bottom portion B of sleeve 18 shown in FIG. 7, which enables the skirt portion of sleeve 18 to be slipped over the cone at D1 and reside within the bore defined by wall W and atop contact features 62 of poppet guide 6 after the poppet guide 6 has been placed in position on the circumferential ledge 37 of FIG. 2 during assembly.

Figure 10:
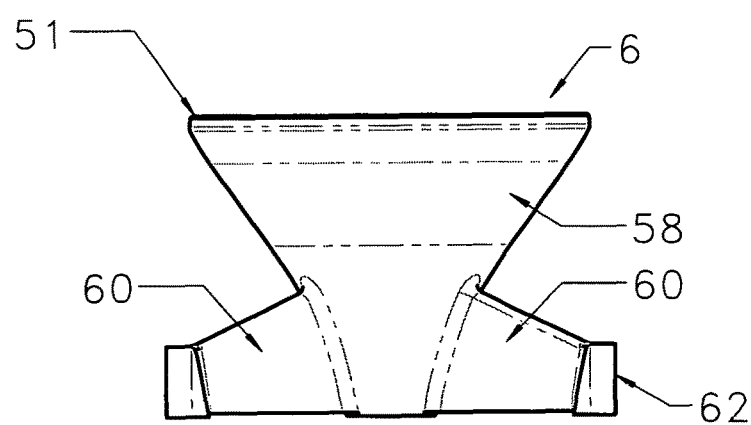
FIG. 10 shows a side view of a poppet guide component of a coupler according to some embodiments of the invention.

FIG. 10 is a side elevation view of poppet guide 6 showing the respective locations of conical element 58, contact features 62, top ring portion 51 at diameter D1, and support arms 60 according to some embodiments.

Figure 11:
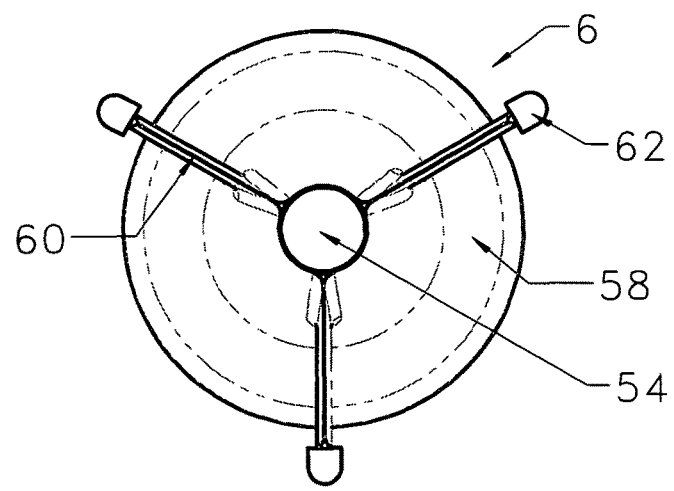
FIG. 11 shows an underside view of a poppet guide component of a coupler according to some embodiments of the invention.

FIG. 11 shows a bottom view of poppet guide 6 showing the respective locations of poppet guide bore 54, support arms 60, contact features 62, and conical element 58.

Figure 12:
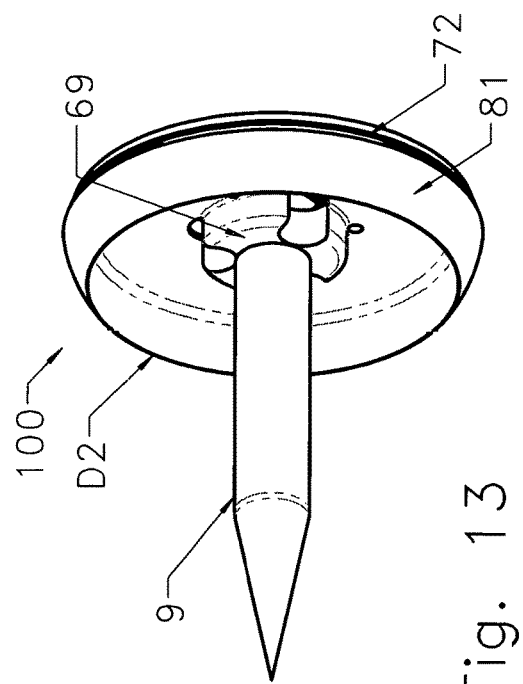
FIG. 12 shows a top perspective view of poppet and shaft components according to some embodiments of the invention.
Figure 14:
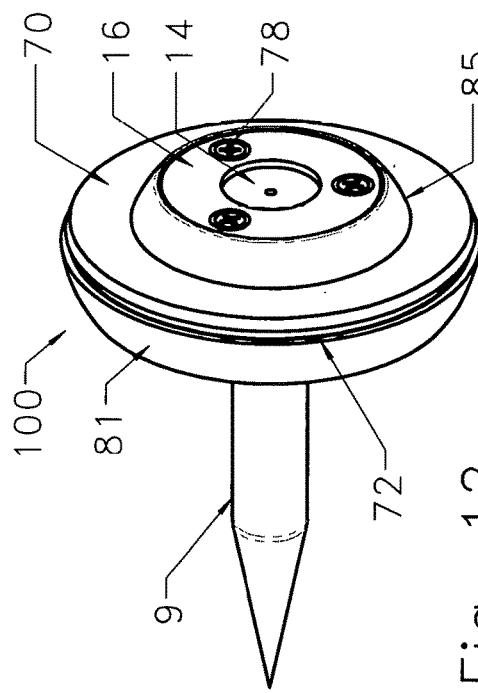
FIG. 14 shows a side view of poppet and shaft components according to some embodiments of the invention.

FIG. 12 is a perspective view of a combination including poppet shaft 9 and poppet 100, showing top surface 70 of poppet 100, valve face 81, and o-ring land 72 which in some embodiments can be a groove circumferentially present as shown (FIG. 14). Poppet shaft 9 in some embodiments is cylindrical having either a sharp point or a smooth tapered distal end 68 (FIG. 19) which functions synergistically with the remaining components of coupler 700 to enhance flow rates of liquids passing through couplers 700, 701 when engaged. In some embodiments vent disc 14 is disposed in a recess within elevated portion 85 present upon flat top surface 70, the vent disc being mechanically biased by spring 12 (FIG. 1) and maintained in position by retainer ring 16, retainer ring 16 being maintained in position by means of machine screws 78 threaded into holes present on elevated portion 85 of top surface 70. Vent disc 14 in some embodiments includes a hole 15 that passes through the vent disc itself. In some embodiments vent disc 14 is slidably disposed within a bore that extends into elevated portion 85.

Figure 13:
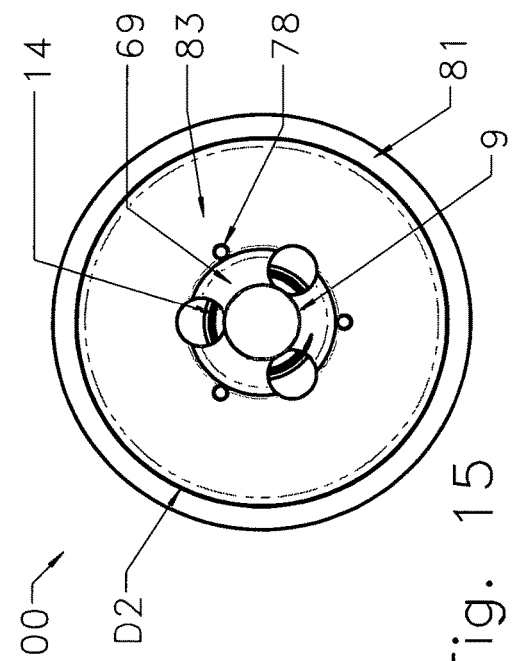
FIG. 13 shows an underside perspective view of poppet and shaft components according to some embodiments of the invention.

FIG. 13 is a lower perspective view of the poppet 100, showing valve face 81, o-ring land 72, and stem receiver boss 69 which is configured to receive the proximal end of poppet shaft 9. Poppet 100 features valve face 81 having innermost diameter at D2 in addition to its largest diameter dimension, and being dimensioned sufficiently to complement the contour of poppet guide 6 at its diameter D1 (FIG. 9) in a smoothly-transitioning fashion, these components having streamlined contours as shown herein which synergistically function with other features and components herein to enhance the flow of liquid substances through central bore 34.

Figure 15:
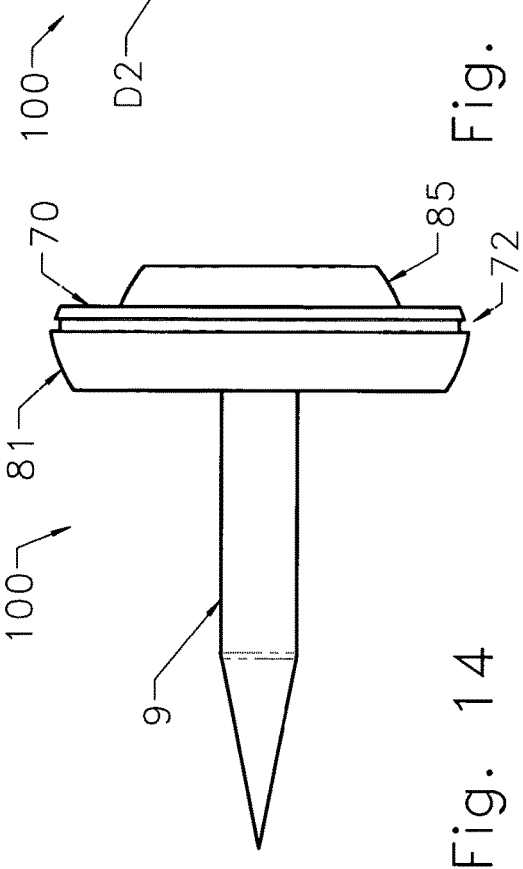
FIG. 15 shows a bottom view of poppet and shaft components according to some embodiments of the invention.

FIG. 14 shows a side elevation view of poppet 100 with stem 9 disposed in stem receiver boss 69. Shown are top surface 70, elevated portion 85, valve face 81, and ring land 72. FIG. 15 depicts a bottom perspective view of poppet 100 having a diameter at D2, stem receiver boss 69, vent disc 14 visible through the three holes shown that lead to the bore disposed through the elevated portion 85, valve face 81, poppet stem 9, bottom surface 83, and ends of machine screws 78. In some embodiments D2 and valve face 81 are dimensioned sufficiently to substantially match D1 of poppet guide 6 at the top portion of cone 58 (FIG. 10) so that valve face 81 is disposed at the top portion of the cone 58 with no irregular edges or other flow-inhibiting features or profile discontinuities present at the juncture of poppet guide 6 and poppet 100 past which a liquid substance flows when couplers herein are engaged to one another, providing minimal turbulence with respect to liquid flow at such juncture.

Poppet stem 9 is of sufficient diameter as to provide a snug fit to enable poppet stem 9 to be slidably disposed within poppet guide bore 54 much akin to a valve in a guide in a conventional engine cylinder head.

Figure 16:
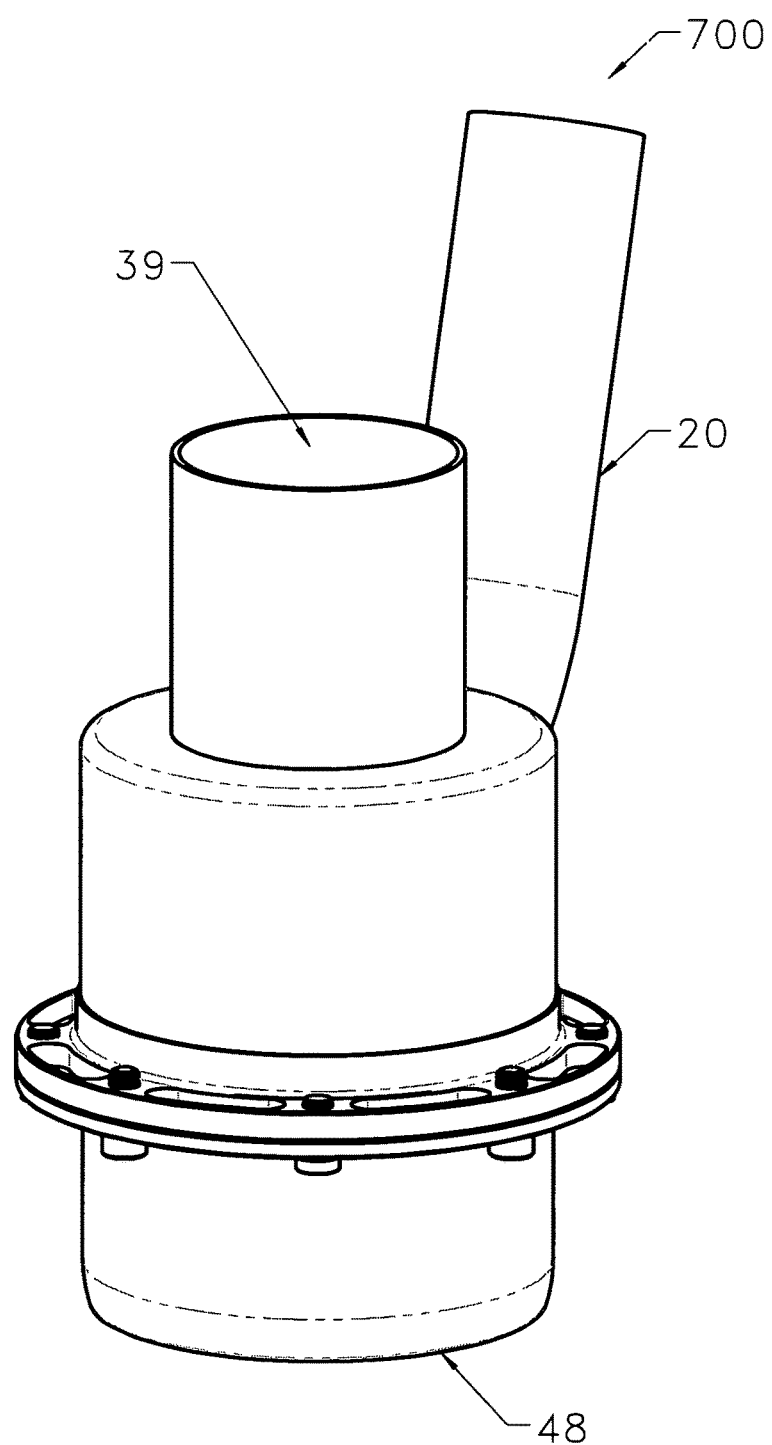
FIG. 16 shows a perspective view of an assembled coupler according to some embodiments of the invention.
Figure 17:
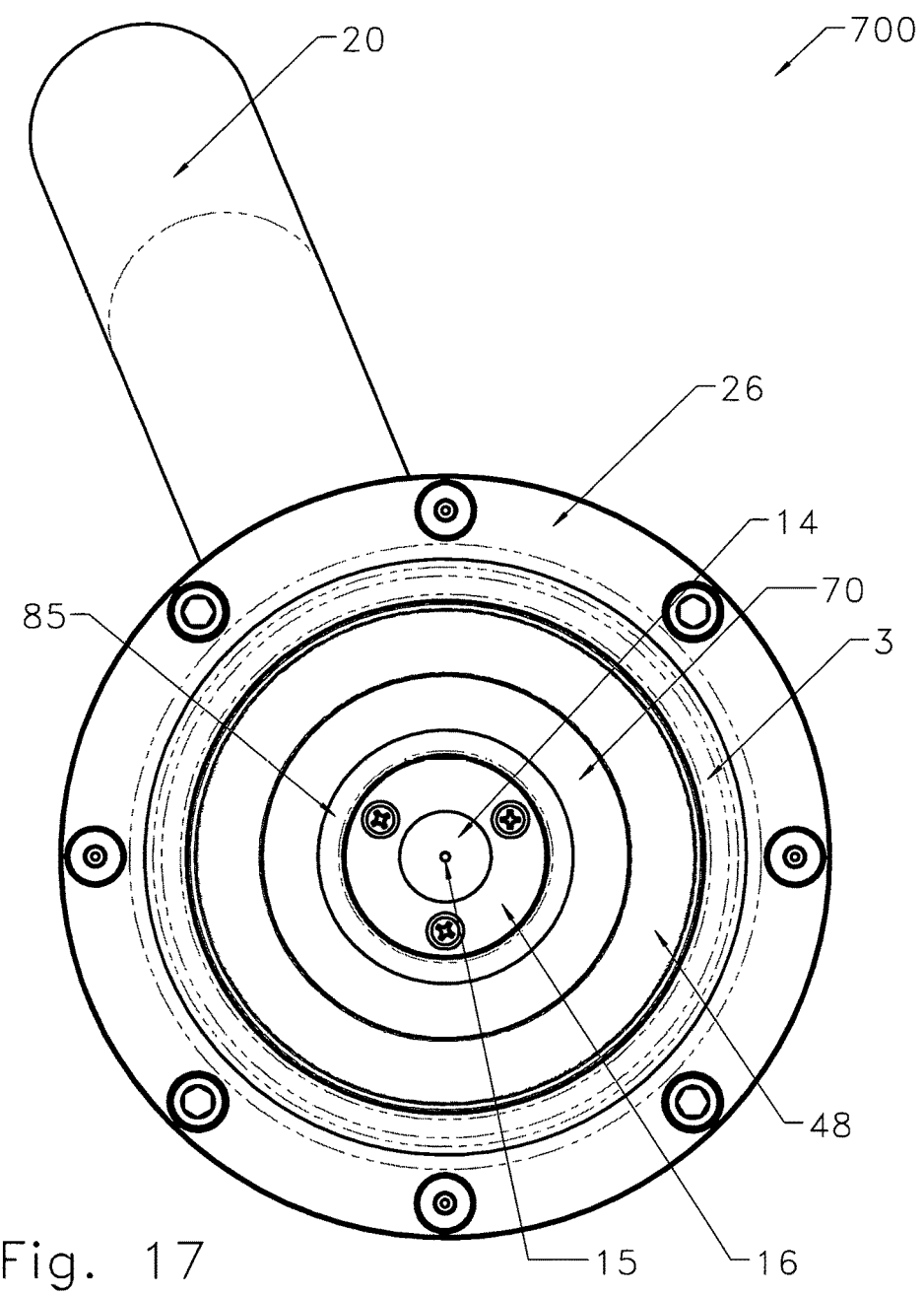
FIG. 17 shows a top view of an assembled coupler according to some embodiments of the invention.

FIG. 16 shows a side perspective view of male coupler 700 in assembled form, having its components shown in FIG. 1 and described herein contained within the coupler cover 2 and coupler base 4. To assemble male coupler 700, one may begin by securing coupler base 4 in a stationary position. Next, poppet guide 6 is placed into position so that contact features 62 of poppet guide 6 reside in slots 17 with poppet spring seat 57 facing upwards, as shown in FIGS. 1, 9. Poppet 100, poppet shaft 9 and poppet bushing 10, spring 8, spring 12, vent disc 14, and retaining ring 16 are assembled as shown and inserted into sleeve 18 from the bottom B (FIG. 8) so that an o-ring seal disposed in land 72 contacts the inner wall of sleeve 18 at a location on the interior of the sloping shoulder 49, which in some embodiments is a machined bevel that sealingly engages with o-ring seal in land 72 when coupler 700 is not coupled to coupler 701. Poppet spring 8 is positioned at spring seat 57 (FIG. 9), and sleeve 18 (with poppet 100 inside it) is then placed into position so that at least part of the skirt portion of sleeve 18 resides within a bore having a wall W of coupler base 4 such that spring 8 mechanically biases poppet 100 towards a closed position in which o-ring present in land 72 sealingly engages a portion of the interior wall surface of sleeve 18. Male coupler cover 2 is placed over sleeve 18 and using fasteners is secured to coupler base 4, to provide male coupler 700. FIG. 16 also depicts the vapor tube 20, top surface 48, and first end 39 of central bore 34. In some embodiments spring 8 is 10.2 centimeters long at rest and has a spring force of about 51 Newtons when compressed to an installed length of 5.5 centimeters. Springs having other force constants sufficient to enable the invention to perform as herein described are also useful within the scope of this disclosure, as those of ordinary skill in the art readily appreciate after reading this disclosure FIG. 17 shows a top view of the assembled male coupler 700, showing the respective locations of vent disc 14, optional vent hole 15, retaining ring 16, vapor tube 20, flange 26, flat top surface 48 of sleeve 18, elevated portion 85, top surface 70 of poppet 100, and top surface 3 of the male coupler cover 2.

Figure 18:
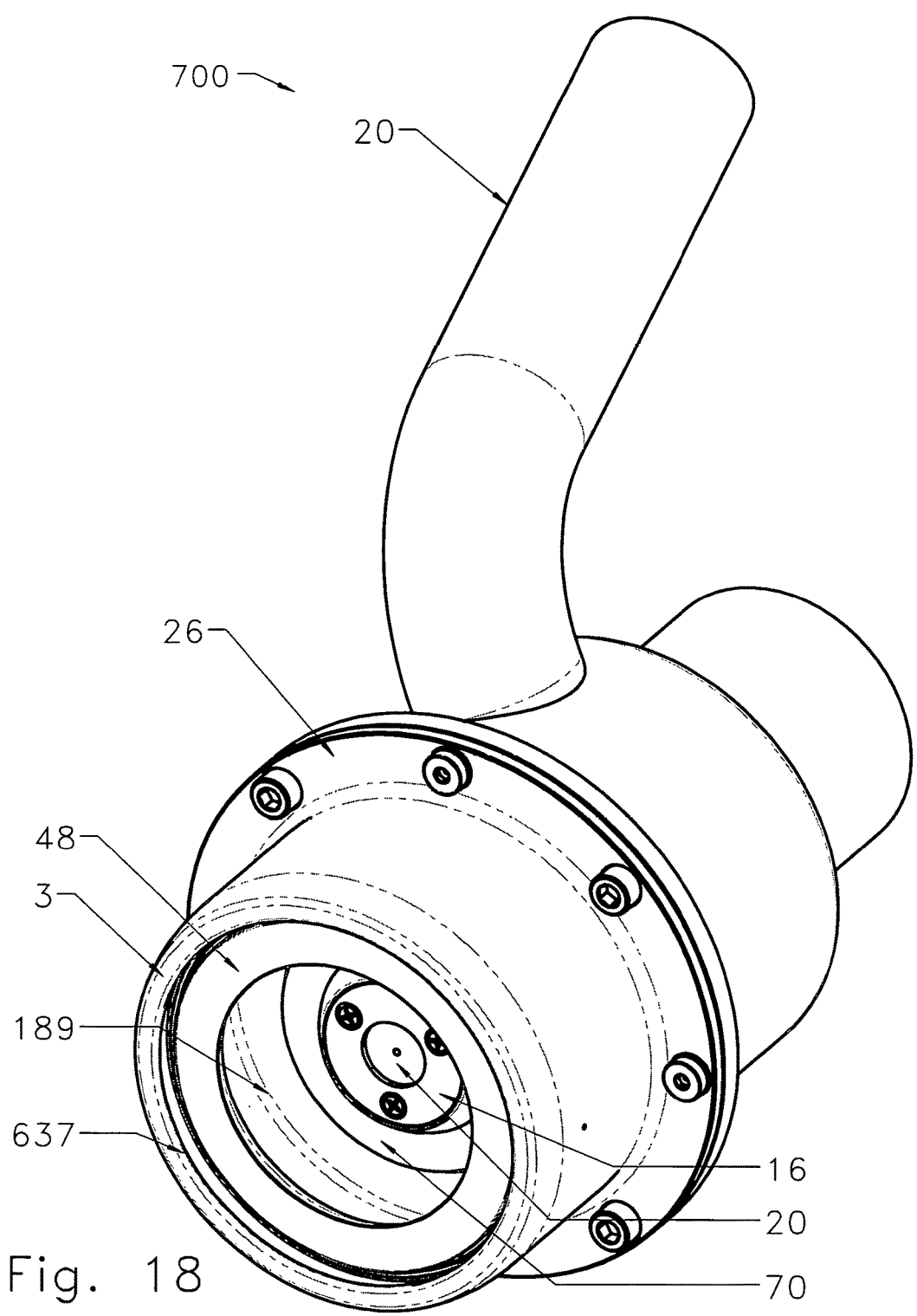
FIG. 18 shows an overhead perspective view of an assembled coupler according to some embodiments of the invention.

In some embodiments during coupling of couplers 700, 701 as provided herein, as flat top surface 70 of poppet 100 is depressed slightly at first, against the pressure of spring 8, both poppet 100 and sleeve 18 move into the assembly as a whole, until skirt 55 of sleeve 18 has bottomed out against circumferential ledge 37 of base 4. The movement of sleeve 18 to its bottomed-out position creates an annular opening at gap 637 (FIG. 18) between the inner wall of male coupler cover 2 and outer wall of sleeve 18 by releasing the contact between the o-ring seal 50 and beveled edge 30. This slight depressing of the flat top surface 48 of sleeve 18 makes fluid communication to exist between vapor tube 20 and space at gap 637 at the top portion of the assembly where o-ring seal 50 has separated from beveled edge 30, through the plurality of holes 33 in male coupler base 4.

Figure 46:
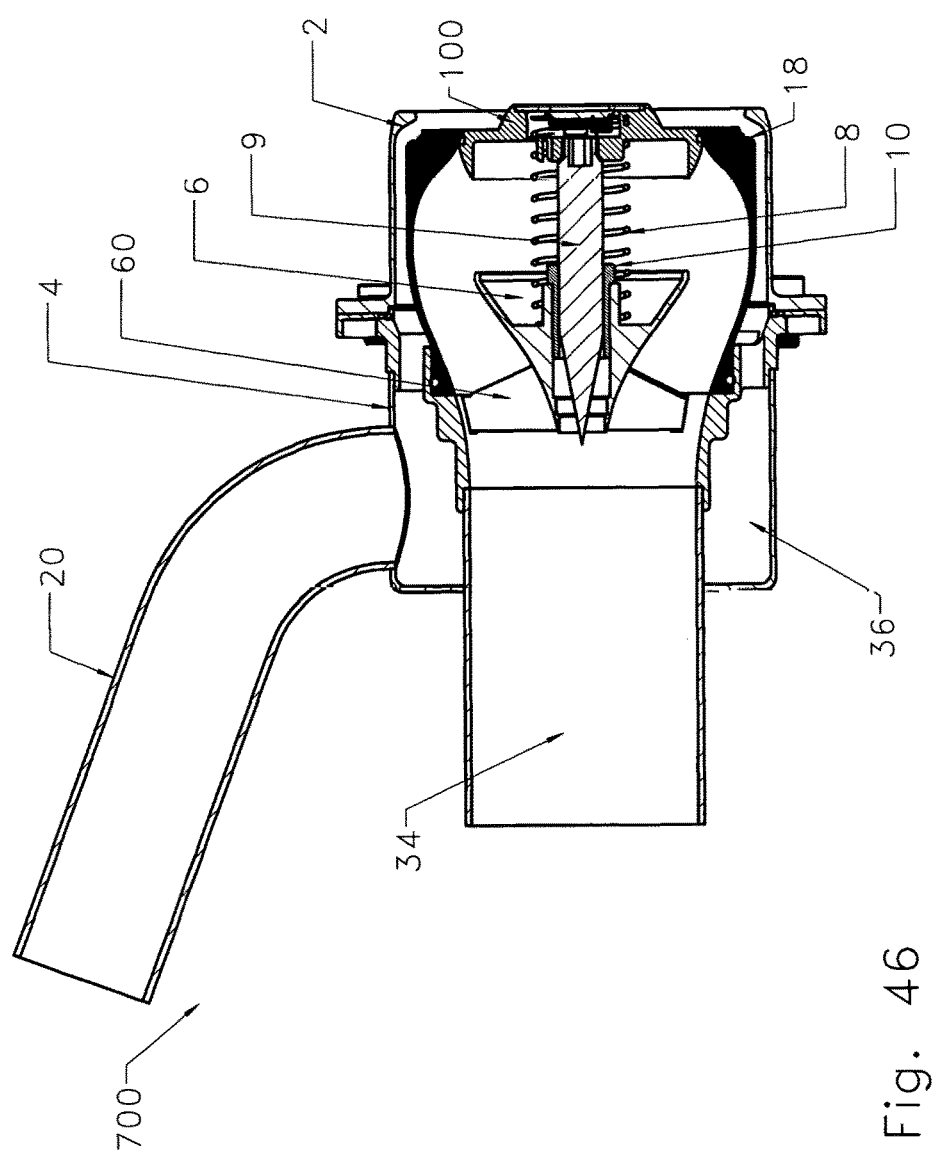
FIG. 46 shows a side cutaway view of a coupler according to some embodiments of the invention.

Further depressing surface 70 of poppet 100 such as by the force of poppet 154 in couplers 700, 701 when engaged creates an opening 189 between the outer periphery of the top surface 70 of the poppet 100 and the internal wall of sleeve 18, enabling a liquid fuel to pass through the inner volume of sleeve 18, through central bore 34 to end 39 and to the inlet pipe on a vehicle's fuel tank or other receiving vessel. Vapor tube 20 in some embodiments has a hose or any other suitable conduit affixed to it which is in fluid communication with the headspace vapor within the fuel tank or other receiving vessel. Thus, by depressing flat top surface 70 of poppet 100, a fluid communication between the headspace vapor in the fuel tank and the gap at 637 is created, and depression of poppet 100 creates a second passage to the receiving vessel, fuel tank, etc. for a liquid such as a motor fuel to flow through central bore 34. Spring 8 is disposed to mechanically bias poppet 100 towards a closed position (FIG. 46). Poppet 100 is centrally located with respect to the opening at the top of sleeve 18, and the head of poppet 100 is of a diameter that is larger than the diameter of the circular opening in sleeve 18 adjacent to top surface 48, the contact of poppet 100 with sleeve 18 accordingly causing sleeve 18 to be effectively spring-biased towards a closed position by spring 8 as well. Sleeve 18 is held in position within cover 2 partly by the diameter and contour of the exterior wall of sleeve 18 at shoulder 49 being sufficient to engage with and be held by beveled edge 30 in the interior of coupler cover 2.

Figure 19:
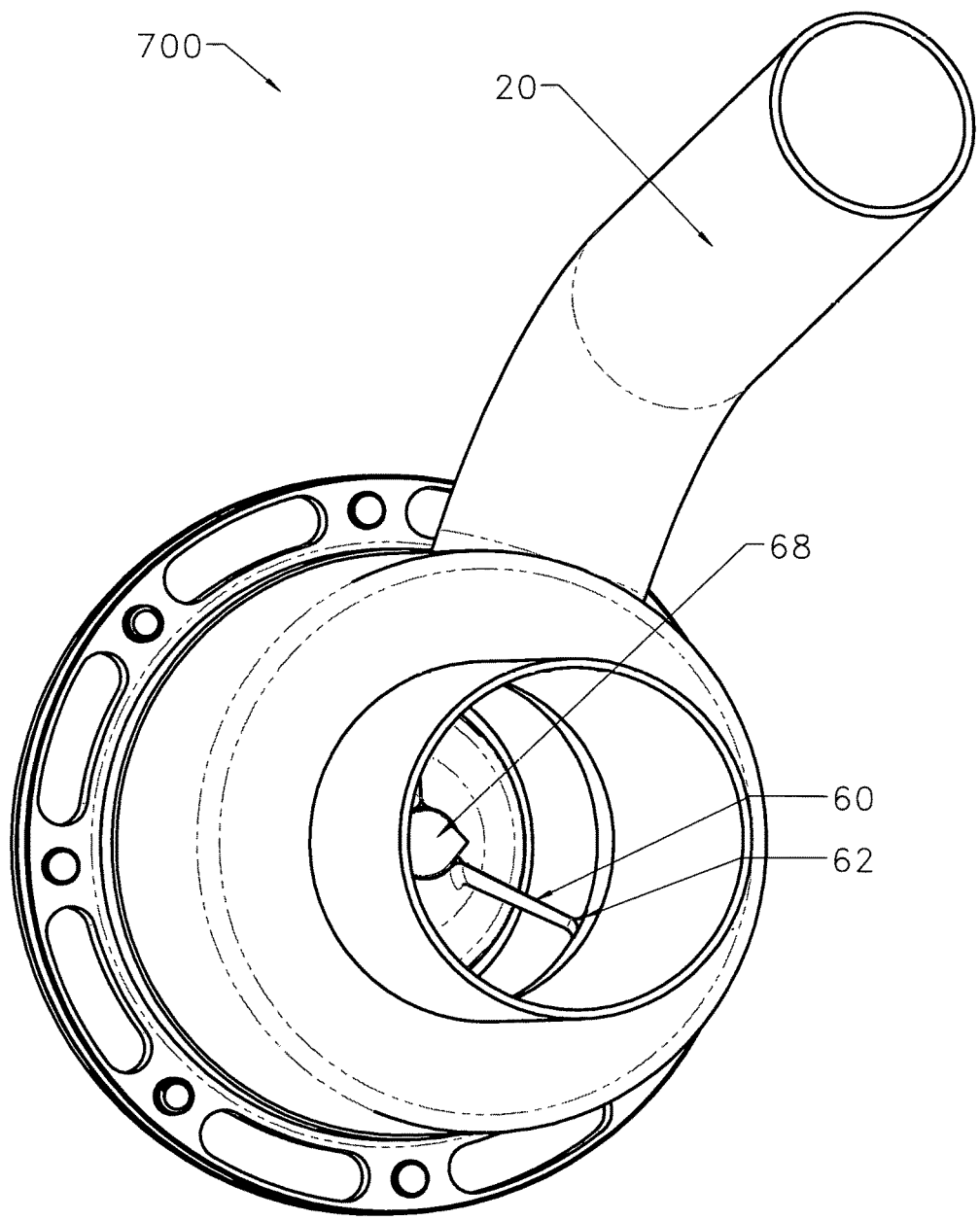
FIG. 19 shows an underside perspective view of an assembled coupler according to some embodiments of the invention.
Figure 20:
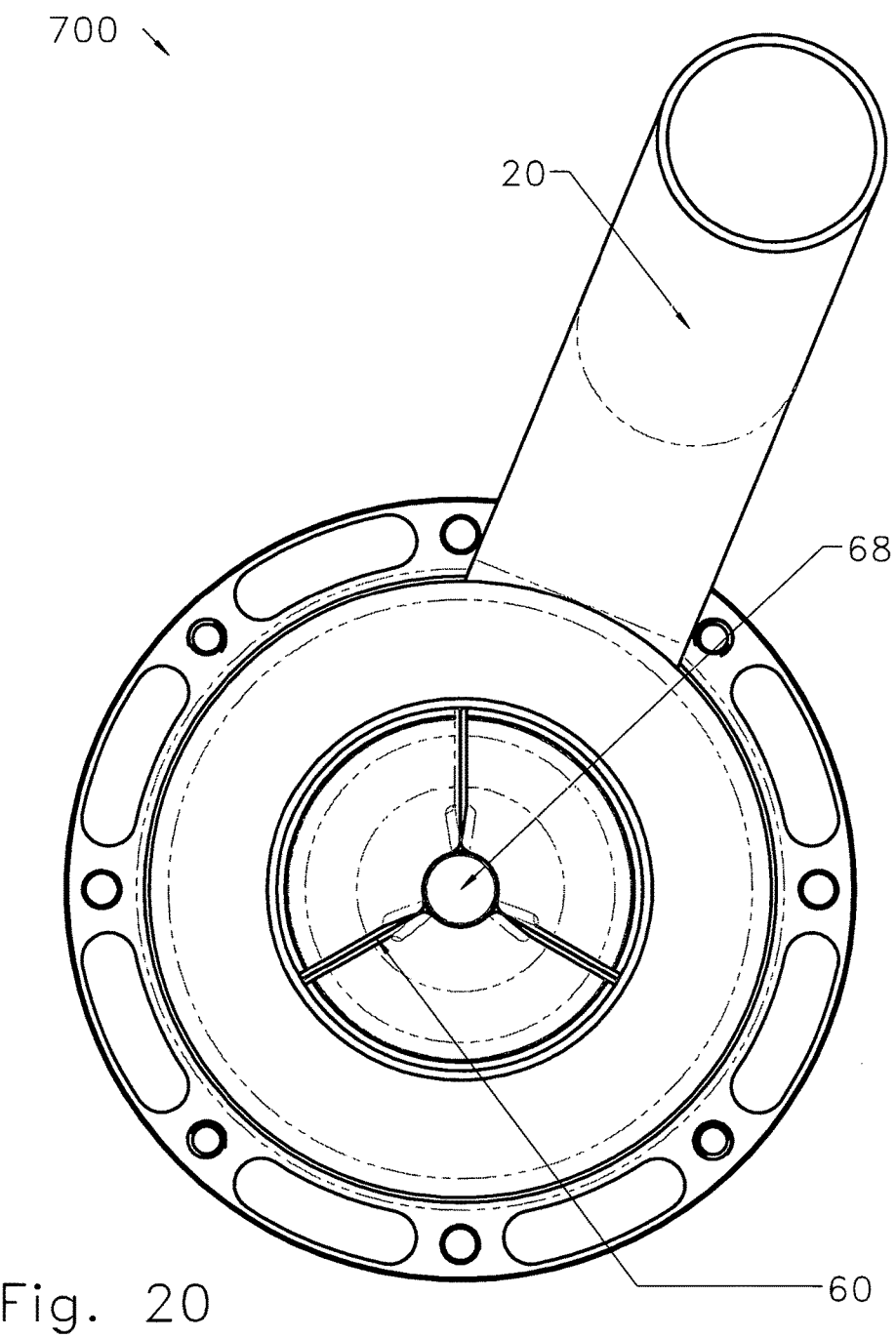
FIG. 20 shows an underside view of an assembled coupler according to some embodiments of the invention.

FIG. 19 shows an underside perspective view of the coupler 700 when the poppet 100 is not depressed, including end 68 of poppet shaft 9, and FIG. 20 shows a direct underside view of coupler 700.

Figure 21:
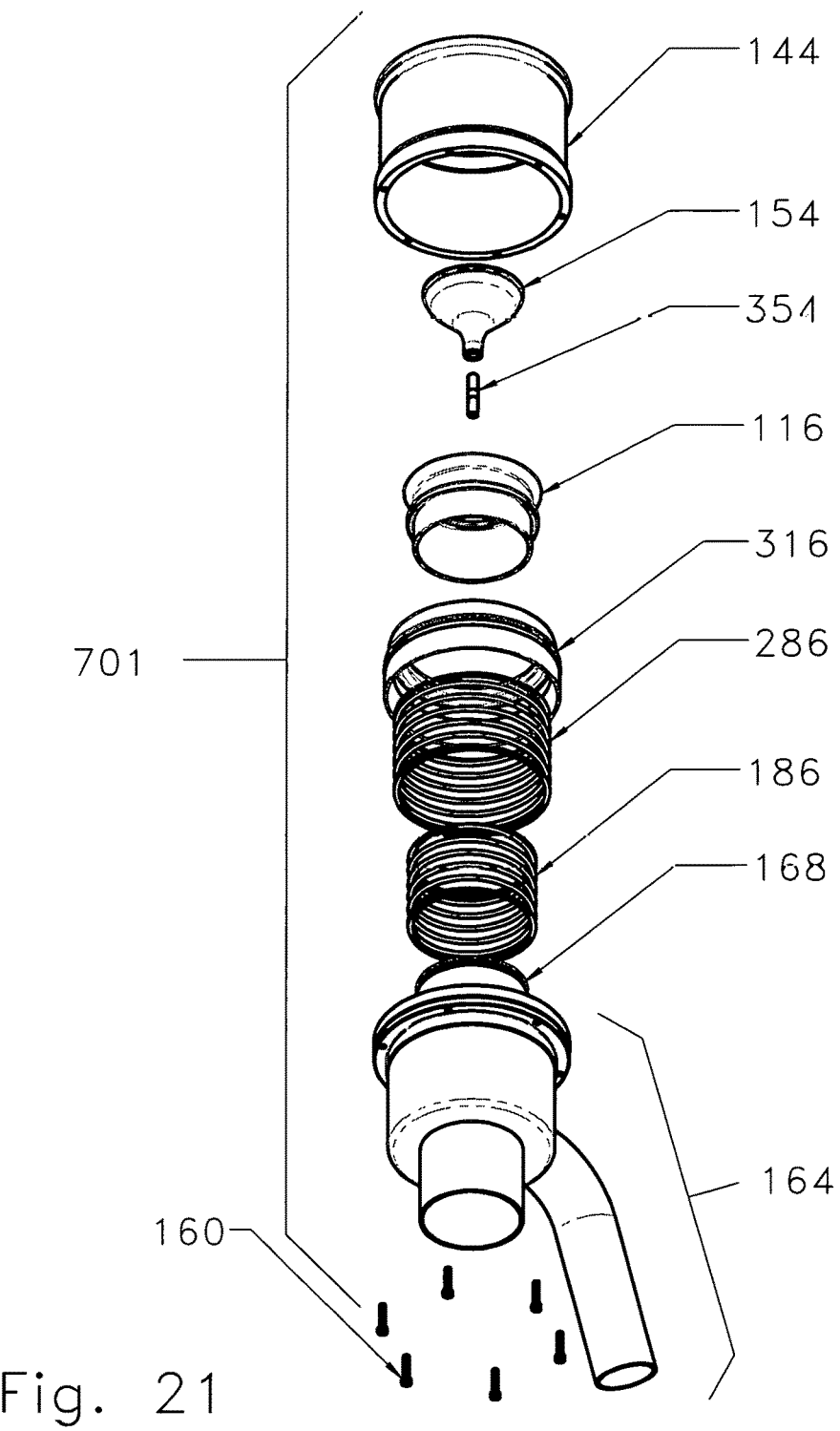
FIG. 21 shows an exploded perspective view of a coupler according to some embodiments of the invention.

A liquid transfer coupling according to some embodiments of the invention comprises a remote coupler 701 which is in fluid communication with a source of liquid substance including chemicals, liquid fuel, etc. that is to be delivered to a tank aboard a motorized vehicle. Such remote coupler 701 in some embodiments has a female character owing to coupler cover 144 being configured to receive or sheathe a male coupler cover 2 of a coupler such as coupler 700. Referring now to FIG. 21 there is shown an exploded view of a coupler 701 according to some embodiments including features such as coupler base 164, billet body 168, inner sleeve spring 186, outer sleeve spring 286, outer sleeve 316, inner sleeve 116, poppet retainer 354, poppet 154, and coupler cover 144, described further below.

Figure 22:
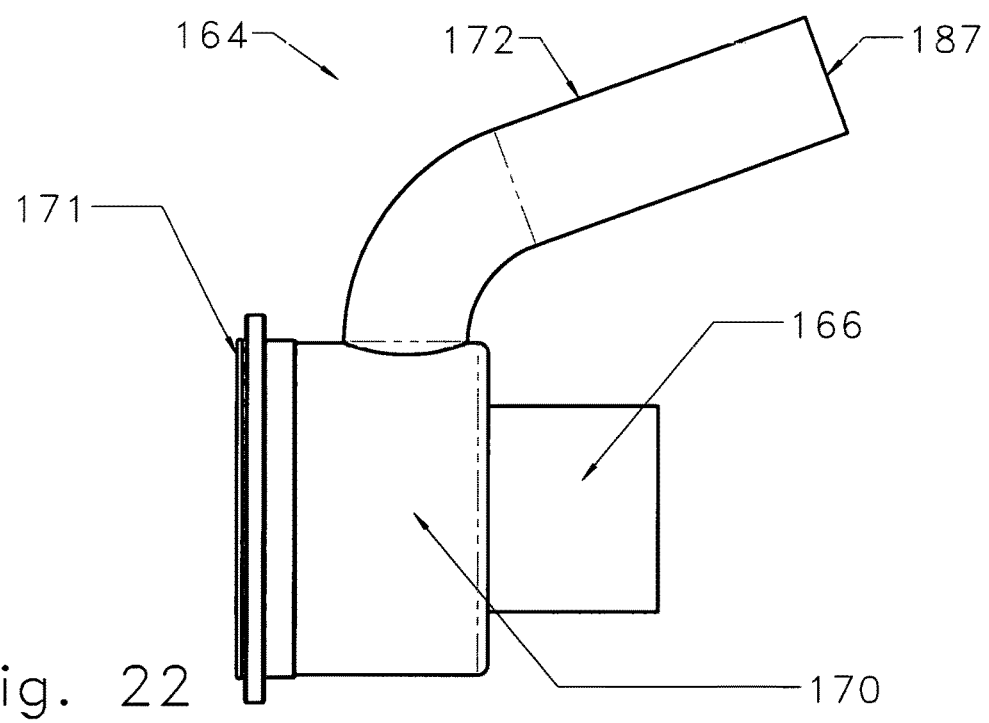
FIG. 22 shows a side view of a base of a coupling according to some embodiments of the invention.

FIG. 22 shows a side elevation view of a coupler base 164 according to some embodiments, including central conduit 166, raised surface 171, shrouding enclosure 170 and outlet 187 of vapor tube 172. In some embodiments central conduit 166 is analogous or equivalent to bore 34 (FIG. 2).

Figure 23:
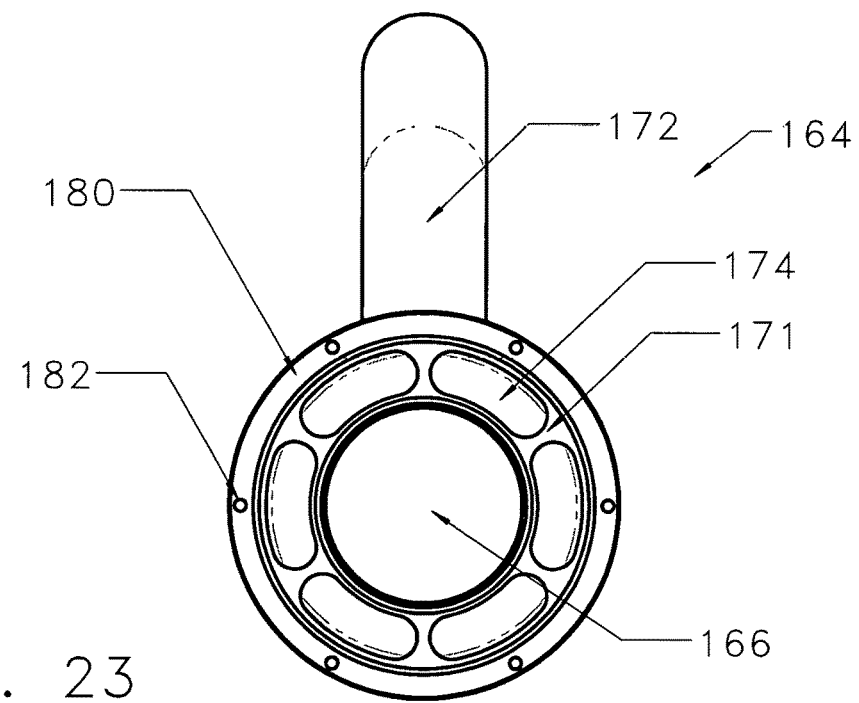
FIG. 23 shows an overhead view of a base of a coupling according to some embodiments of the invention.

FIG. 23 shows a top view of the coupler base 164, including the central conduit 166, raised surface 171, holes 174, vapor tube 172, flange 180, and holes 182. Coupler base 164 includes a central conduit 166 through which a liquid substance is intended to flow, analogous to central bore 34 of coupler 700. Disposed about central conduit 166 is enclosure 170 (FIGS. 22, 24) which envelopes central conduit 166, enabling headspace or other vapors, gasses, etc. to pass out of coupler 700 and through at least one and in some embodiments a plurality of holes 174 disposed through surface 171 into the confines of enclosure 170 and to the end of vapor tube 172.

Figure 24:
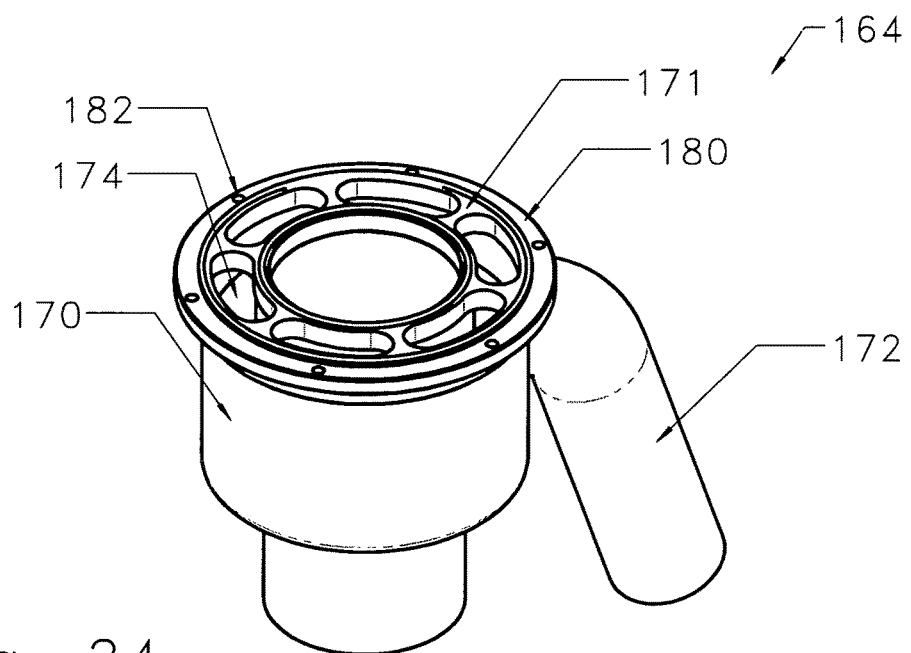
FIG. 24 shows a perspective view of a base of a coupling of a coupling according to some embodiments of the invention.

FIG. 24 shows a perspective view of the upper portion of coupler base 164 for some embodiments, including raised surface 171, shrouding enclosure 170, holes 174, vapor tube 172, and outer annular flange 180 having a plurality of holes 182 disposed therethrough.

Figure 25:
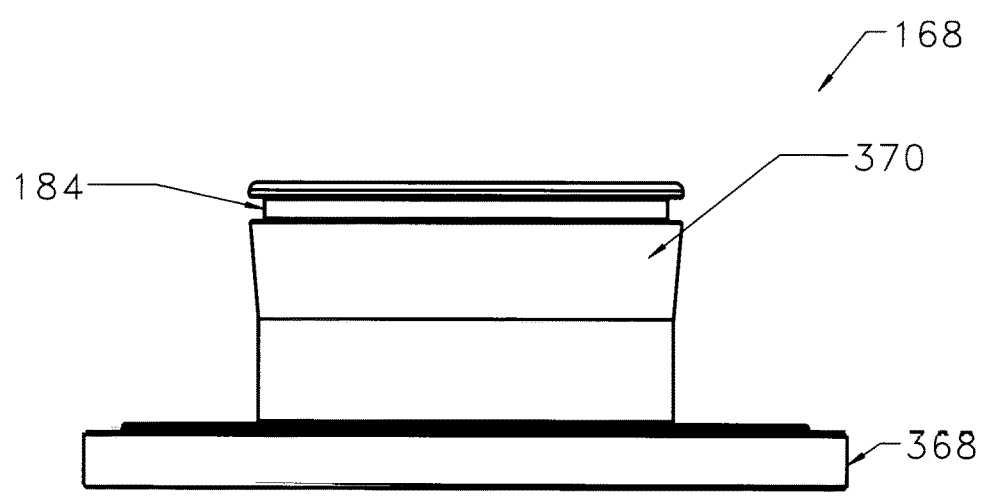
FIG. 25 shows a side view of a billet body component of a coupling according to some embodiments of the invention.

FIG. 25 depicts a side elevation view of billet body 168, including its base 368, o-ring land 184, and central hub 370.

Figure 26:
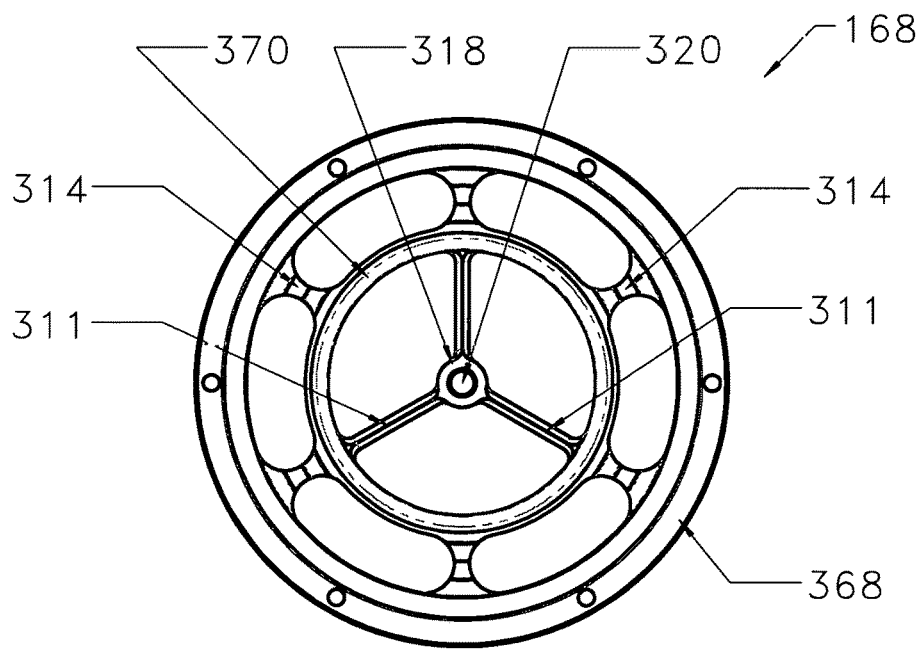
FIG. 26 shows an overhead view of a billet body component of a coupling according to some embodiments of the invention.

FIG. 26 shows an overhead view of billet body 168, including base 368 and hub 370. Hub 370 is centrally-located in some embodiments and is maintained in position by a plurality of radially-extending spoke or any other-shaped supports 314 present adjacent to holes through which vapors etc. are intended to pass exterior to the wall of hub 370, whilst liquid flows through the interior of hub 370 and through central conduit 166. In the interior of hub 370 is boss 318 having a bore 320 configured to receive poppet retainer 354 which in some embodiments is rod-shaped, boss 318 being maintained in position by a plurality of supports 311. In some embodiments, billet body 168 comprises a single piece of a machined, cast, investment cast, forged, or otherwise worked metal, polymer, composite material, or metallic alloy. Holes adjacent to supports 314 are analogous to holes 33.

Figure 27:
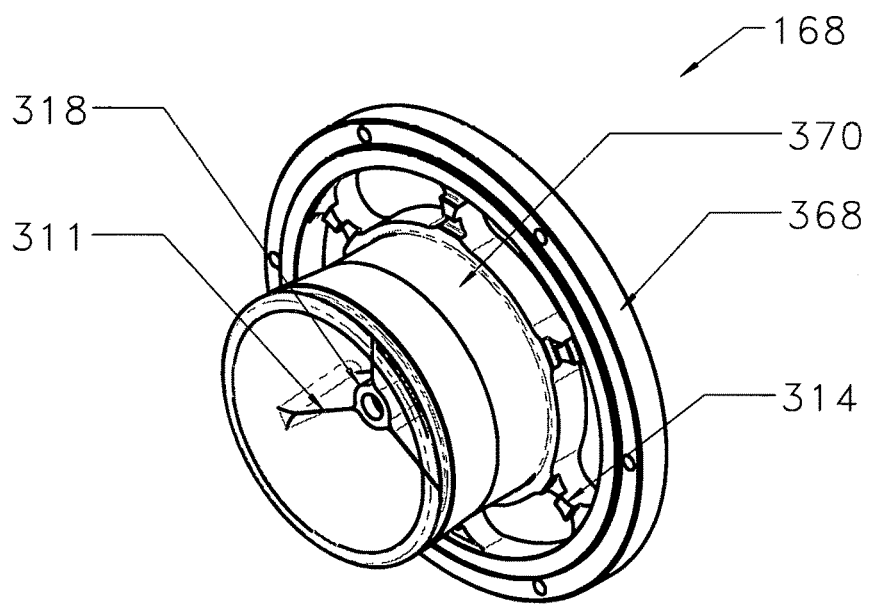
FIG. 27 shows a perspective view of a billet body component of a coupling according to some embodiments of the invention.

FIG. 27 shows a perspective view of billet body 168, including its base 368, central hub 370, supports 314, boss 318, and supports 311. Supports 314 in some embodiments include cutouts or notches sufficient to receive the ends of springs 186, 286 and to maintain them in position.

Figure 28:
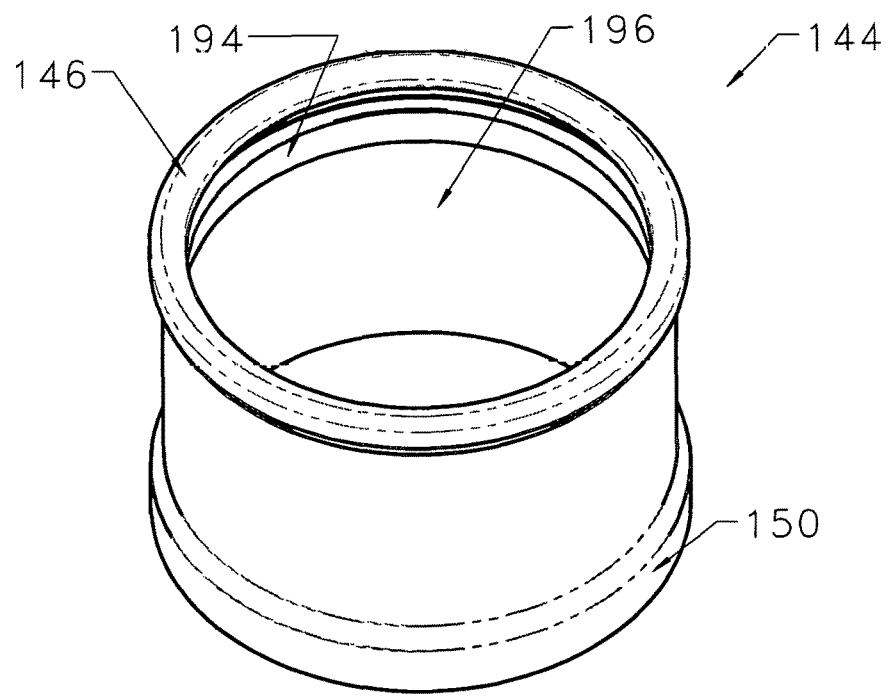
FIG. 28 shows a perspective view of a cover component of a coupling according to some embodiments of the invention.

FIG. 28 shows a perspective view of coupler cover 144, shaped in the form of a hollow cylindrical shell, reminiscent in some sense of a cylinder sleeve. Coupler cover 144 includes a smooth inner bore 196 on its interior wall surface; excepting a raised band 194 near the top surface 146 that extends about the inner circumference or wall of smooth inner bore 196, band 194 creating a ring having a slightly smaller inner diameter than smooth inner bore 196. An o-ring seal 148 is disposed in an annular slot or ring land present just below surface 146 at the upper end of coupler cover 144, which o-ring provides a seal around the outer surface of male coupler cover 2 when male coupler cover 2 is engaged with or inserted into coupler cover 144. Also present is bottom 150, which is flared in some embodiments. Bottom 150 is provided to have a ring of material of sufficient thickness to enable holes 152 to be threaded and have any desired degree of strength for attaching coupler cover 144 to coupler base 164.

Figure 29:
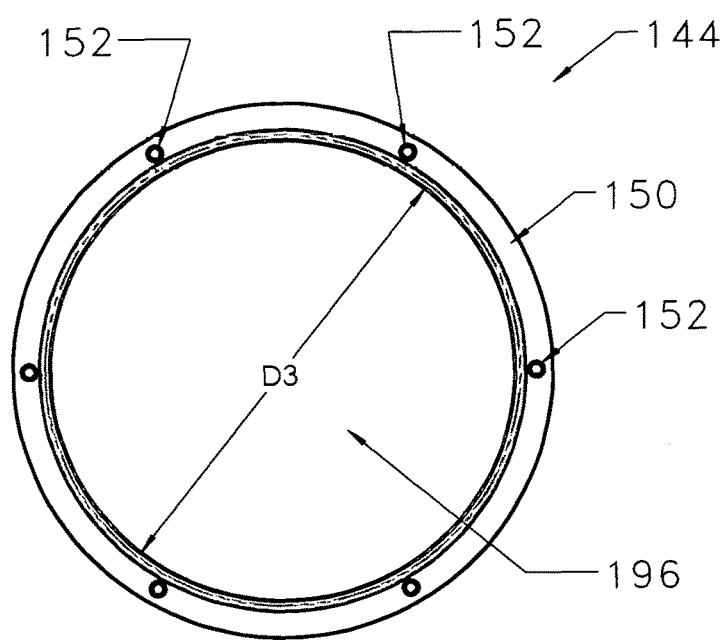
FIG. 29 shows a bottom view of a cover component of a coupling according to some embodiments of the invention.

FIG. 29 shows a bottom view of coupler cover 144, including bottom 150 and a plurality of holes 152 which in some embodiments are threaded, disposed circumferentially about bottom 150, holes 152 being configured to receive a fastener that also passes through the holes 182 in coupler base 164, which are in the same configuration and spacing on both the coupler cover 144 and coupler base 164. Diameter D3 of the smooth inner bore 196 of the coupler cover 144 is just slightly larger than the diameter of the raised surface 171, sufficient to enable coupler cover 144 to be securely fit over the coupler base 164.

Figure 30:
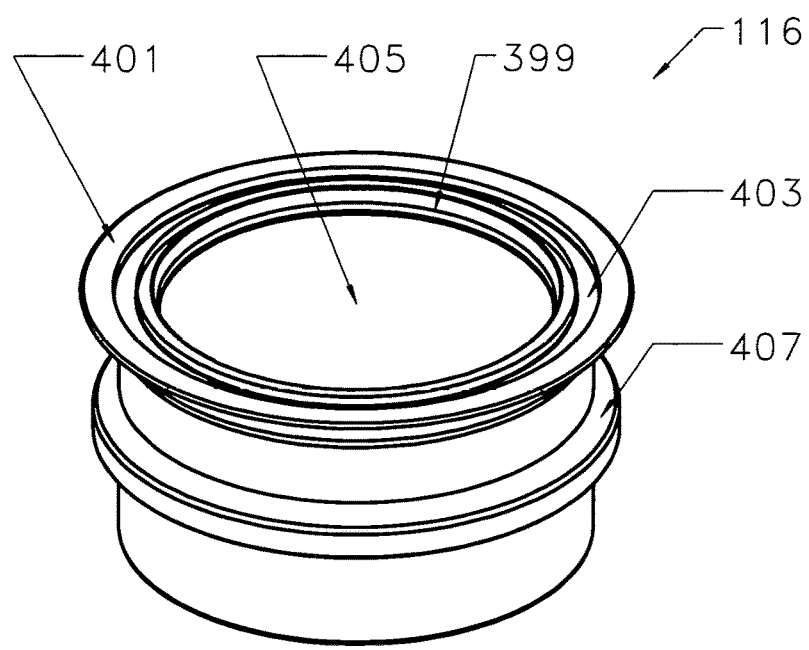
FIG. 30 shows a perspective view of an inner sleeve component of a coupling according to some embodiments of the invention.
Figure 31:
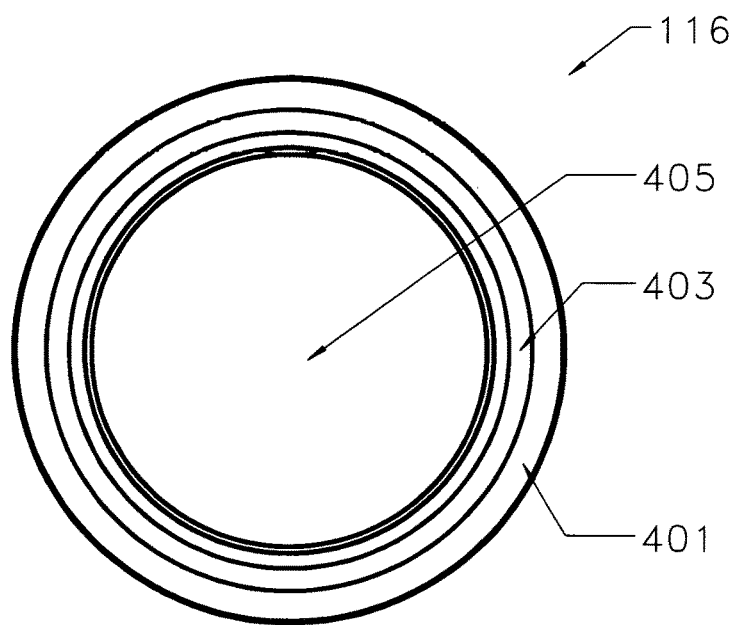
FIG. 31 shows a top view of an inner sleeve component of a coupling according to some embodiments of the invention.
Figure 32:
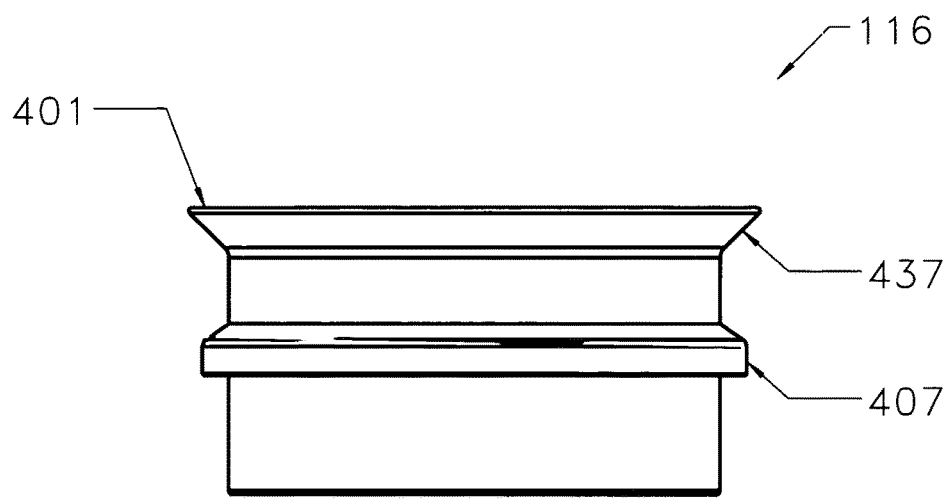
FIG. 32 shows a side view of an inner sleeve component of a coupling according to some embodiments of the invention.
Figure 33:
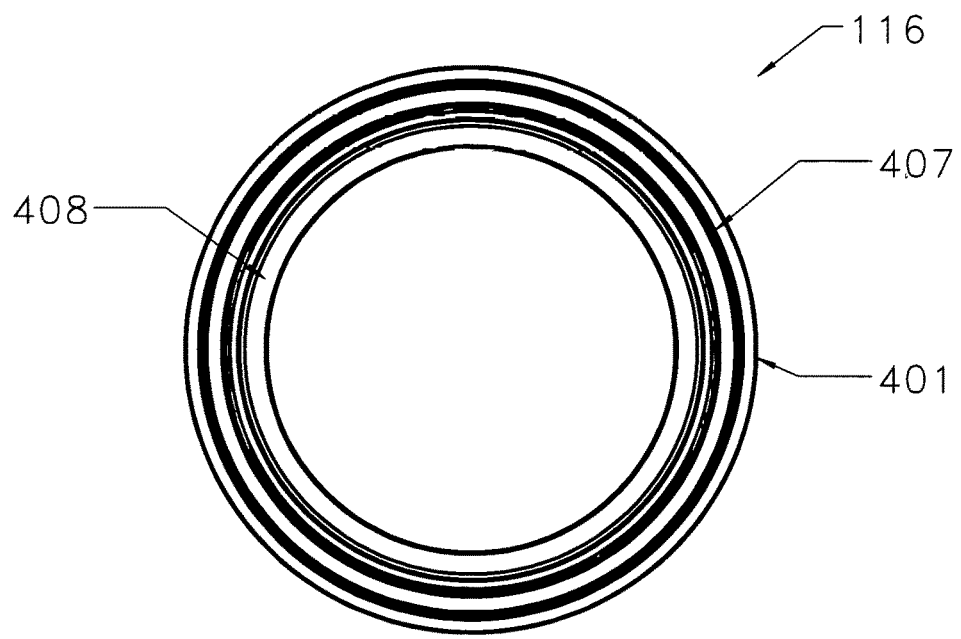
FIG. 33 shows a bottom view of an inner sleeve component of a coupling according to some embodiments of the invention.
Figure 47:
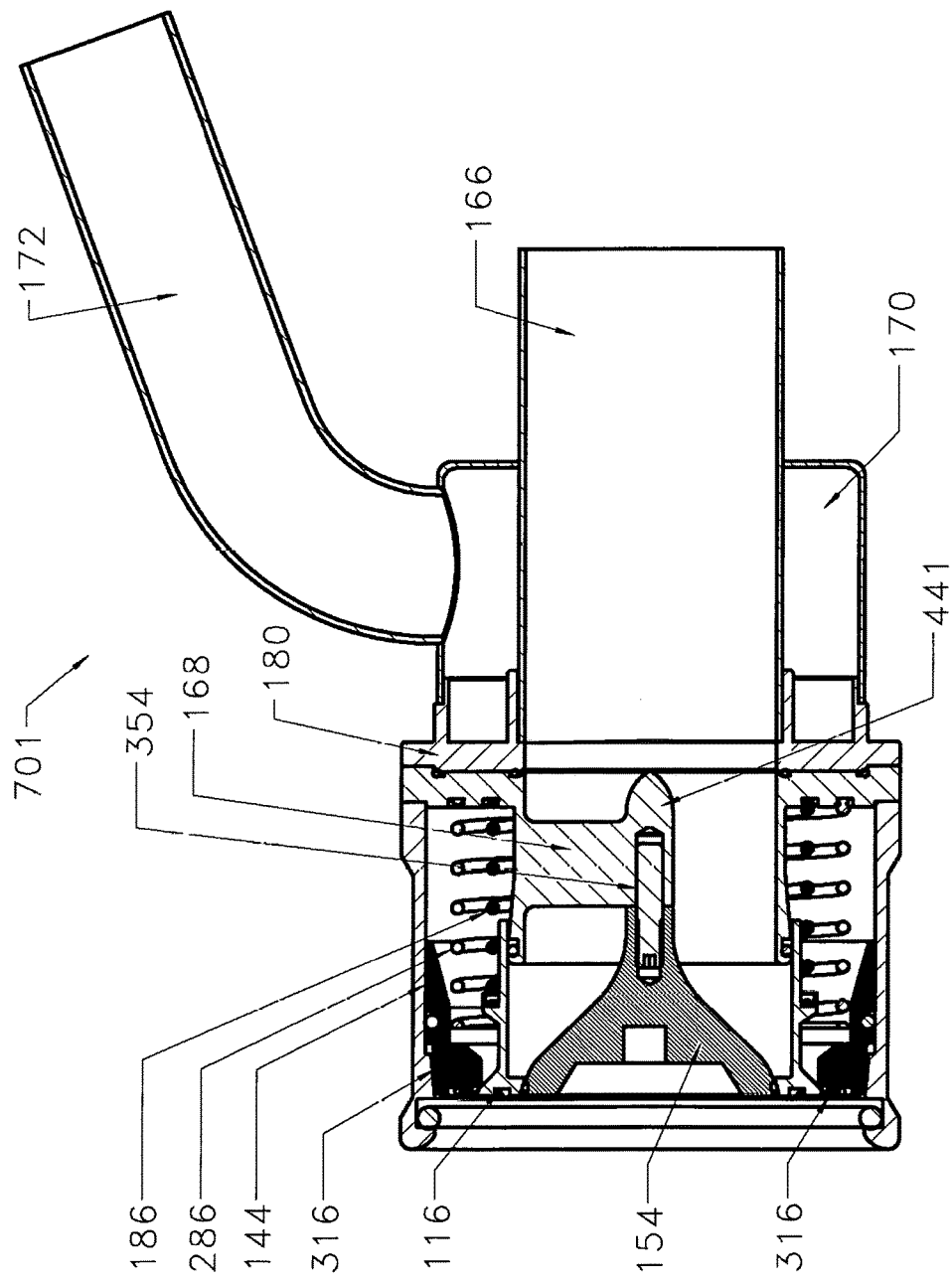
FIG. 47 shows a side cutaway view of a coupler that is complementary to the coupler depicted in FIG. 47 according to some embodiments of the invention.

FIG. 30 shows a perspective view of inner sleeve 116 according to some embodiments, inner sleeve 116 being shaped as a quasi-cylindrical shell or sleeve having a hollow interior 405 and open top and bottom portions, a top 401 at its upper portion adjacent to which is annular groove 403. Inner sleeve 116 also features ring 407 co-extensively disposed about its outer wall, ring 407 being configured to receive and act as a stop for inner spring 186 in a fashion that mechanically biases inner sleeve 116 outwardly from coupler base 164 in a final assembled coupler 701 towards a closed position as shown in FIG. 47. Annular seat 399 is configured and disposed to sealingly engage with o-ring 162 (FIG. 38) of poppet 154, or any other equivalent selected sealing engagement in a coupler 701. In some embodiments, o-ring 162 and the seal on poppet 100 and poppet 154 are compression molded seals incorporated into the poppets to increase fluid flow. FIG. 31 is an overhead view of inner sleeve 116, showing the respective locations of hollow interior 405, top 401 which is flat in some embodiments, and annular groove 403. A side perspective view of inner sleeve 116 is shown in FIG. 32, illustrating its outer wall, top 401, ring 407, and annular seat 437 which is configured to sealingly engage with annular seat 435 (FIG. 34) at the opening at the top of outer sleeve 316 in an assembled coupler 701. FIG. 33 is a bottom perspective view of an inner sleeve 116 according to some embodiments, showing the respective locations of top 401, ring 407, and lip 408 existing beneath seat 399. Thus, inner sleeve 116 in some embodiments features seat 399 and seat 437.

Figure 34:
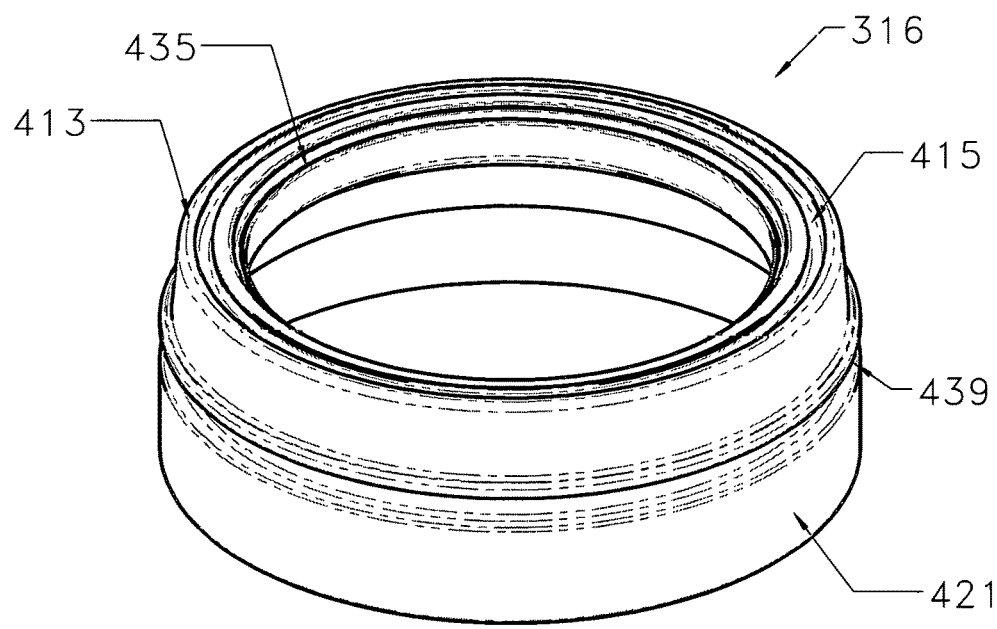
FIG. 34 shows a perspective view of an outer sleeve component of a coupling according to some embodiments of the invention.

FIG. 34 is a perspective view of outer sleeve 316, shaped as a quasi-cylindrical shell or sleeve having a hollow interior and open top and bottom portions. The respective locations of top portion 413, skirt 421 and annular groove 415 that is configured to house an o-ring are depicted. Also shown is annular seat 435 that is configured to contain an o-ring that sealingly engages with annular seat 437 (FIG. 32) in some embodiments of a coupler 701. Annular groove 417 is configured to receive an o-ring 439 which makes a seal with the smooth inner bore 196 (FIG. 28) of coupler cover 144. In some embodiments smooth inner bore 196 is tapered to be of gradually smaller diameter as one proceeds from left to right of FIG. 47, that is, the diameter of smooth inner bore 196 is larger adjacent to spoke supports 314 than adjacent to skirt 421 of outer sleeve 316 in the position shown in FIG. 47. However, the larger diameter area is sufficient dimension to enable sealing engagement between o-ring 439 (FIG. 34) all along the travel of outer sleeve 316. When depressed, o-ring 439 seals with less force against smooth inner bore 196 than when in the position depicted in FIG. 47. This is of advantage when uncoupling couplers 700, 701 from one another as it enables spring force of coupler 701 to meet with less resistance and more rapidly enable outer sleeve 316 to return to the closed position of FIG. 47. The o-ring on outer sleeve 316 seals tightly on the taper of smooth inner bore 196 and when outer sleeve 316 is pushed into coupler 701, which opens the vapor passage, the o-ring seal seals against the larger portion of the smooth inner bore 196. Since the bore is larger, the o-ring still seals but not as tightly as when couplers 700, 701 are disengaged from one another. On disengagement of 700, 701 from one another, outer sleeve 316 is able to move more freely and can more quickly move to a closed position than prior art devices. When disengaged, the smaller diameter of inner bore 196 that contacts the o-ring near the closed position of outer sleeve 316 provides a tighter seal than prior art devices. This feature enables a faster closure and therefore less spillage during disengagement in addition to a tighter seal, as compared with prior art devices. In some embodiments the difference in diameter of smooth inner bore between the positions of the o-ring on the external surface of outer sleeve 316 is and difference between 0.5 millimeters and 3 millimeters, including all values and all ranges of values therebetween.

Figure 35:
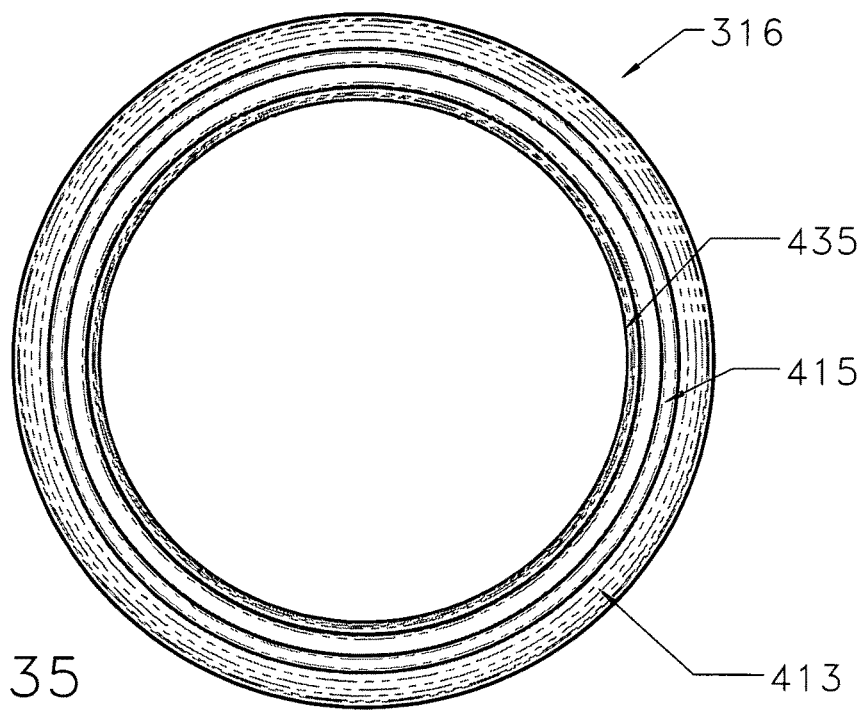
FIG. 35 shows a top view of an outer sleeve component of a coupling according to some embodiments of the invention.
Figure 36:
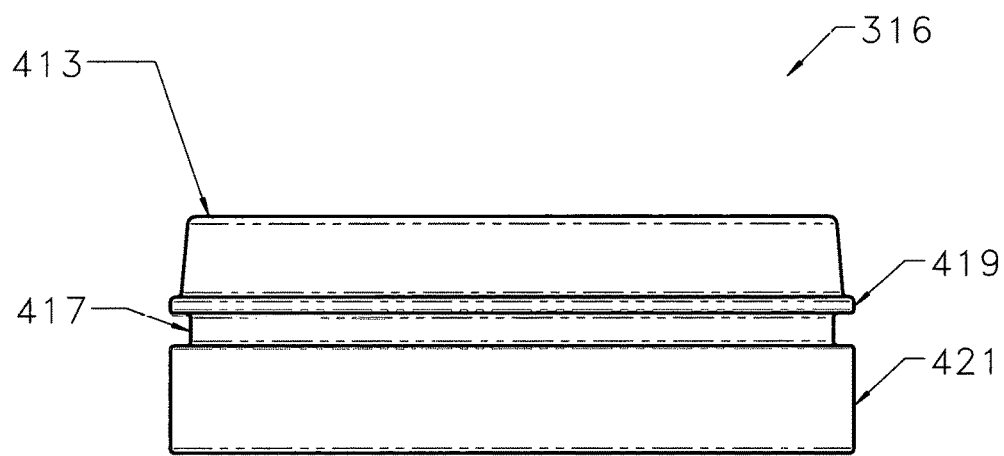
FIG. 36 shows a side view of an outer sleeve component of a coupling according to some embodiments of the invention.
Figure 37:
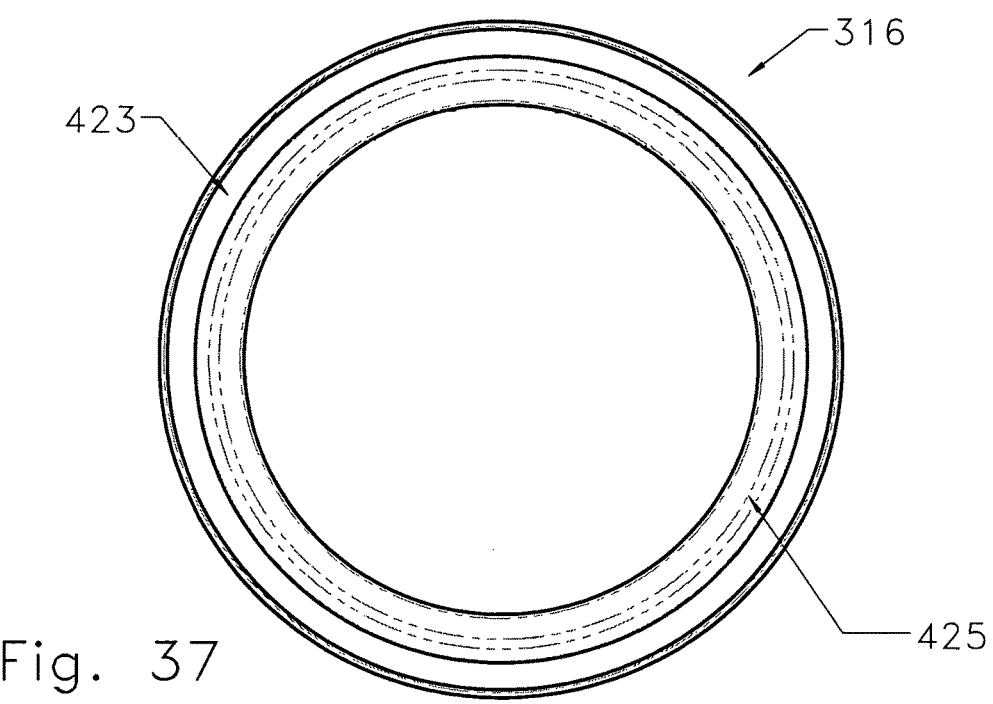
FIG. 37 shows a bottom view of an outer sleeve component of a coupling according to some embodiments of the invention.

FIG. 35 shows an overhead view of outer sleeve 316, including annular groove 415. In FIG. 36 is shown a side perspective view of outer sleeve 316, illustrating the respective locations of top portion 413, annular lip 419, annular groove 417, and skirt 421. In some embodiments the portion of outer sleeve 316 disposed above annular lip 419 and top portion 413 is angled or tapered. FIG. 37 is a bottom perspective view of outer sleeve 316 showing the respective locations of bottom 423 and surface 425.

FIG. 38 shows a perspective view of poppet 154 having a depressed region 158 interior to top surface 156, stem 427, and o-ring 162. Depressed region 158 is contoured to receive elevated portion 85 of poppet 100, enabling a somewhat interlocking and good contact surface area between poppet 154 and poppet 100 at some moments in time during coupling and uncoupling of couplers 700, 701.

FIG. 39 is an overhead view of poppet 154, showing top surface 156, and depressed region 158. FIG. 40 is a side perspective view of poppet 154 illustrating annular o-ring land 185 in which o-ring 162 (FIG. 38) is disposed, stem 427 and its end 433, which includes a bore 429 for receiving poppet retainer 354, which in some embodiments is a short shaft. The location of bore 429 is also shown in the bottom perspective view of poppet 154 in FIG. 41.

Figure 42:
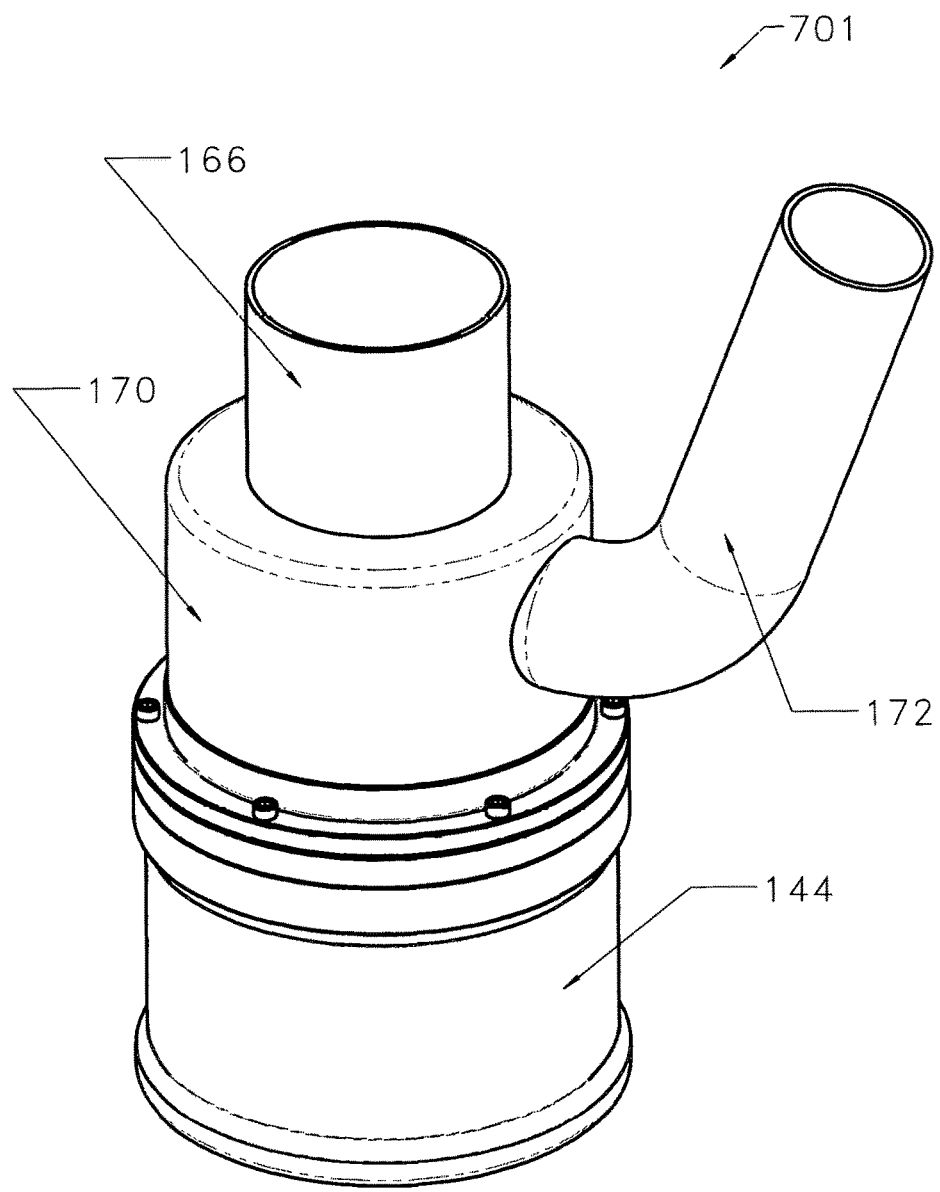
FIG. 42 shows a perspective view of an assembled coupler according to some embodiments of the invention.

FIG. 42 shows a perspective view of coupler 701 in its assembled form, when components of FIG. 21 are contained within coupler cover 144 and coupler base 164. To assemble coupler 701, one orients coupler base 164 so that the bottom of the central conduit 166 and vapor tube 172 are facing downwards. Next, billet body 168 is placed onto coupler base 164 and springs 186 and 286 are placed over hub 370. The bottom portion of inner sleeve 116 is placed through the opening at the top portion 413 of outer sleeve 316, and inner and outer sleeves 116, 316 are then placed over springs 186, 286 and maintained by hand-applied bias against springs 186, 286, after which stationary poppet 154 and poppet retainer 354 are positioned and secured in place so the angled lower portion or seat 437 at top 401 engages with an o-ring present at annular seat 435 (FIG. 34). Poppet 154 is maintained in position in some embodiments by being its attached to poppet retainer 354 such as by complementary threads present inside poppet retainer bore 429 and on the exterior of poppet retainer 354. The remaining end of poppet retainer 354 is similarly secured to bore 320 of billet body 168 (FIG. 26). Coupler cover 144 is then secured in place using fasteners 160 (FIG. 21) which pass through holes 182 (FIG. 23) and into the threaded holes 152 (FIG. 29), securing the construct as a unit. Threads are not necessary for maintaining poppet 154 in position in some embodiments as the remaining elements of a combination herein provided are configured so that poppet 154 is confined to being stationary by virtue of other elements maintaining it in position as evident from FIG. 47.

Figure 43:
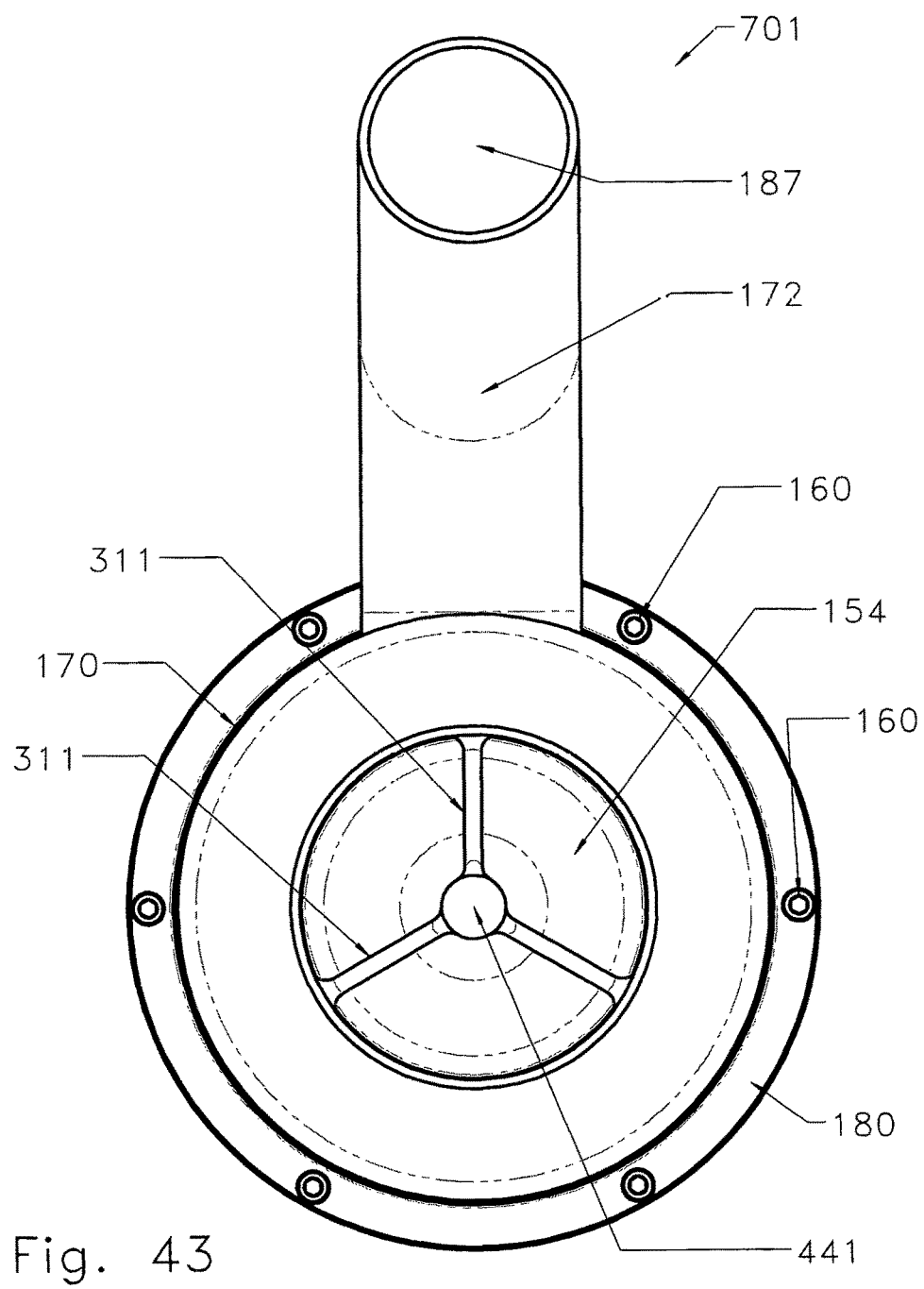
FIG. 43 shows a bottom view of an assembled coupler according to some embodiments of the invention.

FIG. 43 is a bottom view of assembled coupler 701 showing the respective locations of flange 180, fasteners 160, supports 311, poppet 154, enclosure 170, flange 180, vapor tube 172, hub 441, and vapor tube outlet 187.

Figure 44:
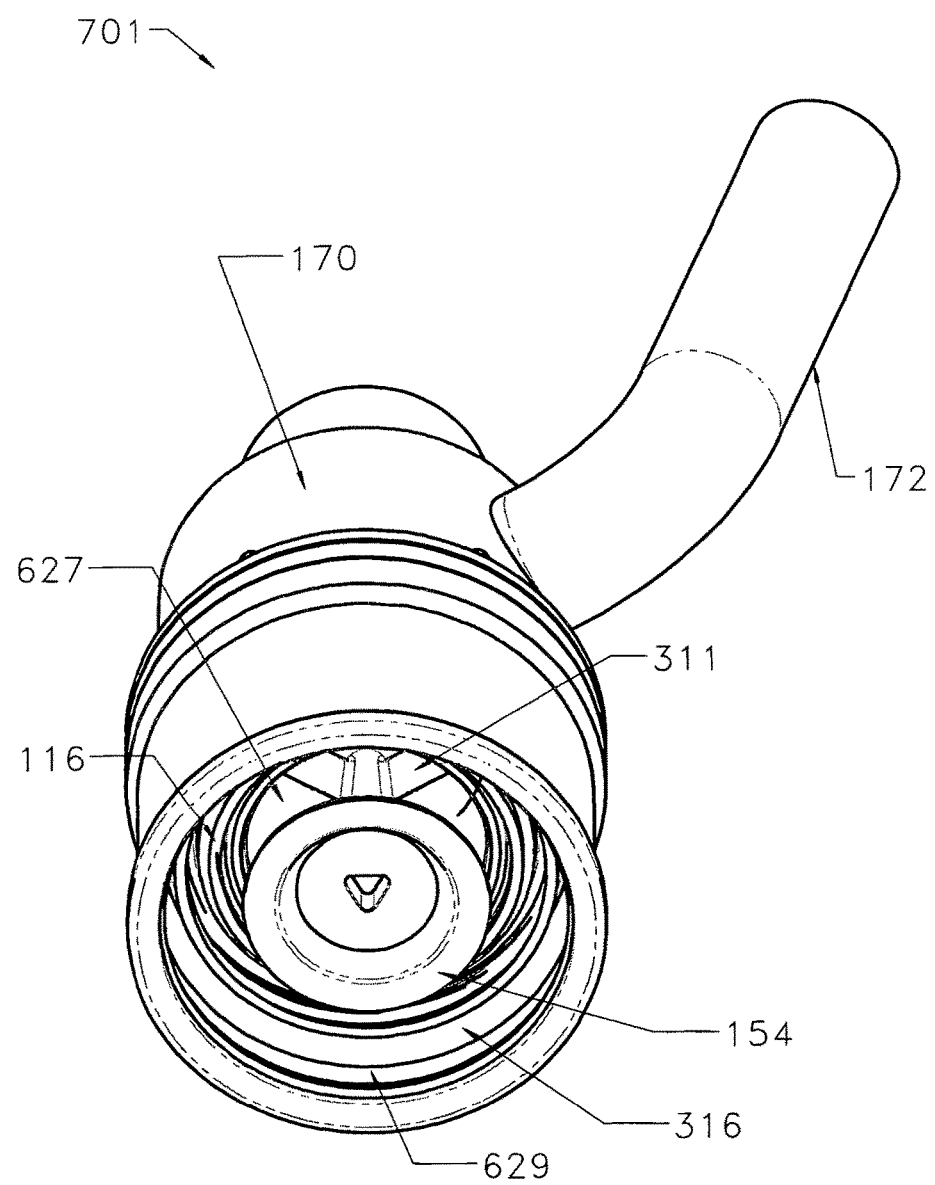
FIG. 44 shows an overhead perspective view of an assembled coupler according to some embodiments of the invention.

FIG. 44 is a perspective view of a coupler 701 when the inner sleeve 116 and outer sleeve 316 have been pushed against springs 186, 286, showing the respective locations of poppet 154, supports 311, inner sleeve 116, outer sleeve 316, enclosure 170 and vapor tube 172. Liquid opening 627 and vapor opening 629 are shown, which are the openings of passages through which a liquid exits coupler 701 and vapor enters coupler 701 respectively during a transfer such as re-fueling a race car.

Figure 45:
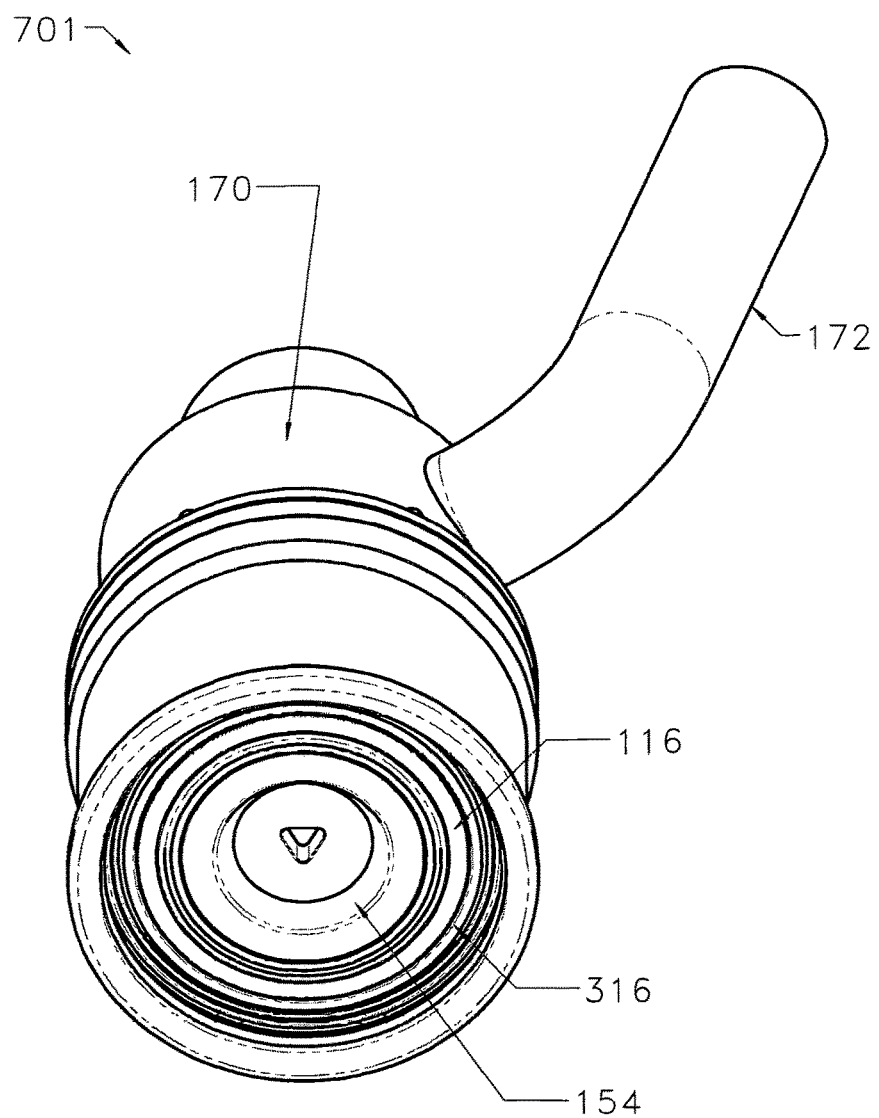
FIG. 45 shows an overhead perspective view of an assembled coupler according to some embodiments of the invention.

FIG. 45 is a perspective view of a coupler 701 in a closed position, showing the respective locations of poppet 154, inner sleeve 116, outer sleeve 316, enclosure 170 and vapor tube 172.

FIG. 46 is a side cutaway perspective view of an assembled coupler 700, showing the respective locations of vapor tube 20, coupler base 4, shrouding enclosure 36, support arm 60, poppet guide 6, poppet shaft 9, spring 8, coupler cover 2, poppet 100, sleeve 18, poppet bushing 10, and central bore 34.

FIG. 47 is a side cutaway perspective view of an assembled coupler 701, showing the respective locations of vapor tube 172, central conduit 166, enclosure 170, hub 441, outer sleeve 316, poppet 154, inner sleeve 116, coupler cover 144, outer spring 286, inner spring 186, poppet retainer 354, flange 180, and billet body 168.

Operation of a coupler 701 includes the following events. A force is applied to the top portion 413 (surface) of outer sleeve 316 by top surface 3 of cover 2 of coupler 700, against the pressure of the spring 286 and substantially simultaneously, top surface 48 of sleeve 18 pushes against the top 401 of inner sleeve 116 against the pressure of spring 186. Each of outer sleeve 316 and inner sleeve 116 are pushed against the force of their respective springs' pressure until they each bottom out by contacting base 368 of billet body 168. Outer sleeve 316 and inner sleeve 116 are configured so this action causes opening of a passage between outer sleeve 316 and inner sleeve 116 which opening comprises a vapor passage 629 (FIGS. 44, 48). In its contact with top 401 of inner sleeve 116, sleeve 18 makes a seal with an o-ring present in groove 403. The motion of inner sleeve 116 also opens a liquid passage 627 (FIG. 44) between poppet 154 and inner sleeve 116 that is separate and distinct from vapor passage 629, by virtue of annular seat 399 of inner sleeve 116 having been moved away from the o-ring seal 162 of the poppet 154. This enables liquid to pass through the interior of sleeve 18 and vapor being able to pass along the exterior of sleeve 18 in a countercurrent direction to the travel of liquid.

FIG. 48 is a side cutaway perspective view of couplers 700, 701 when connected to one another, illustrating the path of vapor flow 409 and the path of liquid flow 411 during an operation in which a liquid is transferred from one vessel to another with simultaneous flow out of the receiving vessel of vapors present therein.

Figure 49:
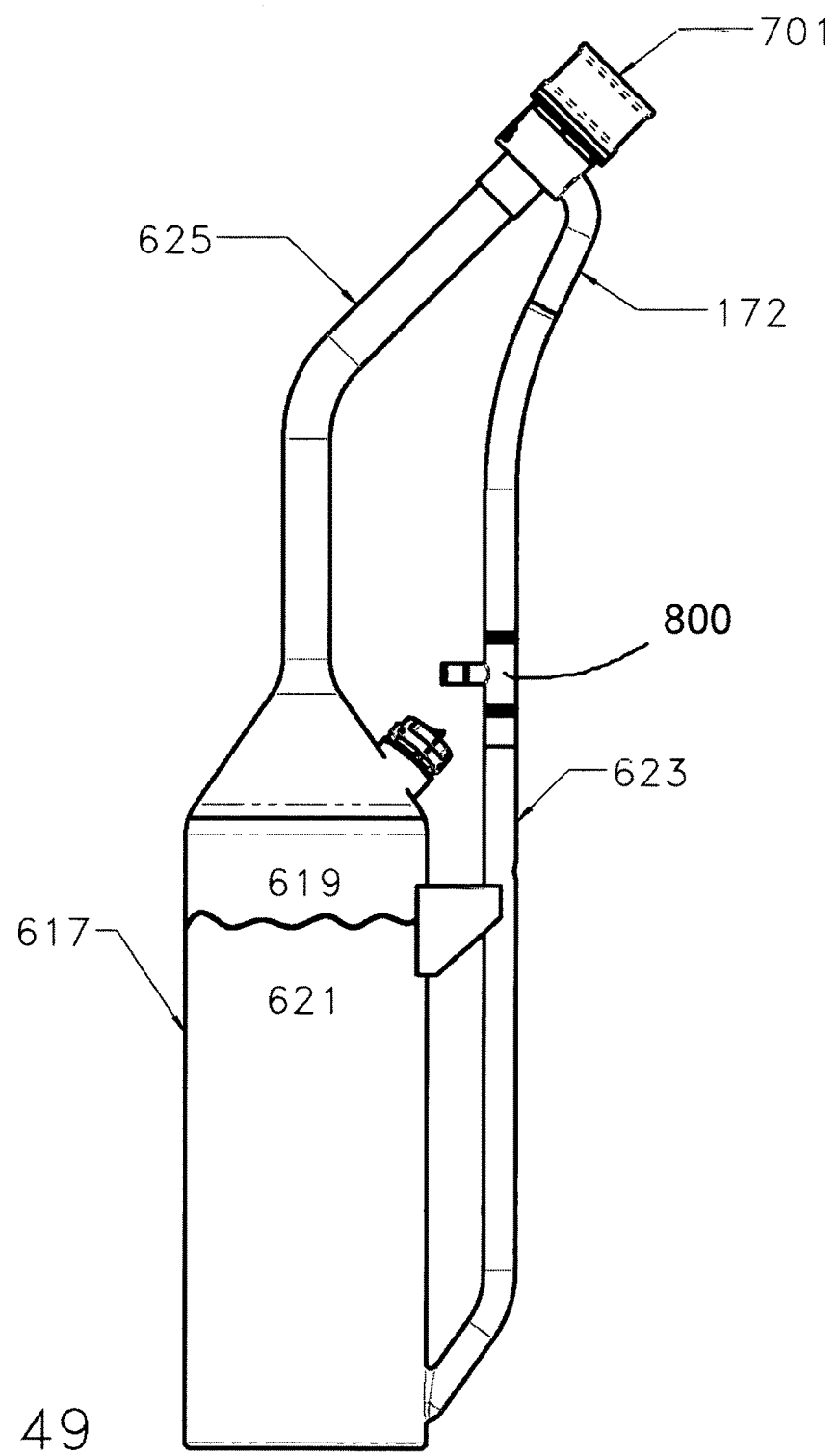
FIG. 49 shows a side view of a remote fuel reservoir having a coupler provided hereby attached thereto.

FIG. 49 shows a side view of a fuel containment vessel 617 commonly used to re-fuel race vehicles during races. Vessel 617 comprises a fuel outlet conduit 625 which can simply be a pipe, vessel 617 containing a liquid fuel 621, and having a headspace 619 above the liquid fuel, and further comprising coupler 701 whose vapor tube 172 is in effective fluid communication with the headspace 619 above the fuel 621 in said fuel containment vessel 617 by means of a tubing 623, when vessel 617 is inverted 180 degrees (upside-down) of the view depicted in FIG. 49 such as during a vehicle re-fueling operation when coupler 701 is about to be affixed over a male coupler 700, with central conduit 166 portion being in effective fluid communication with said outlet conduit 625. In some embodiments vessel 617 is a remote vessel with a capacity on the order of 50 liters or less and can be carried by one or two men, such as when it is desired to re-fuel a motorized vehicle using a coupling comprising the couplers 700, 701. Also depicted in FIG. 49 is a two-way pressure equilibrium valve 800 useful in accordance with some embodiments of the disclosure, shown and described hereinafter with reference to FIGS. 54-62.

Figure 50:
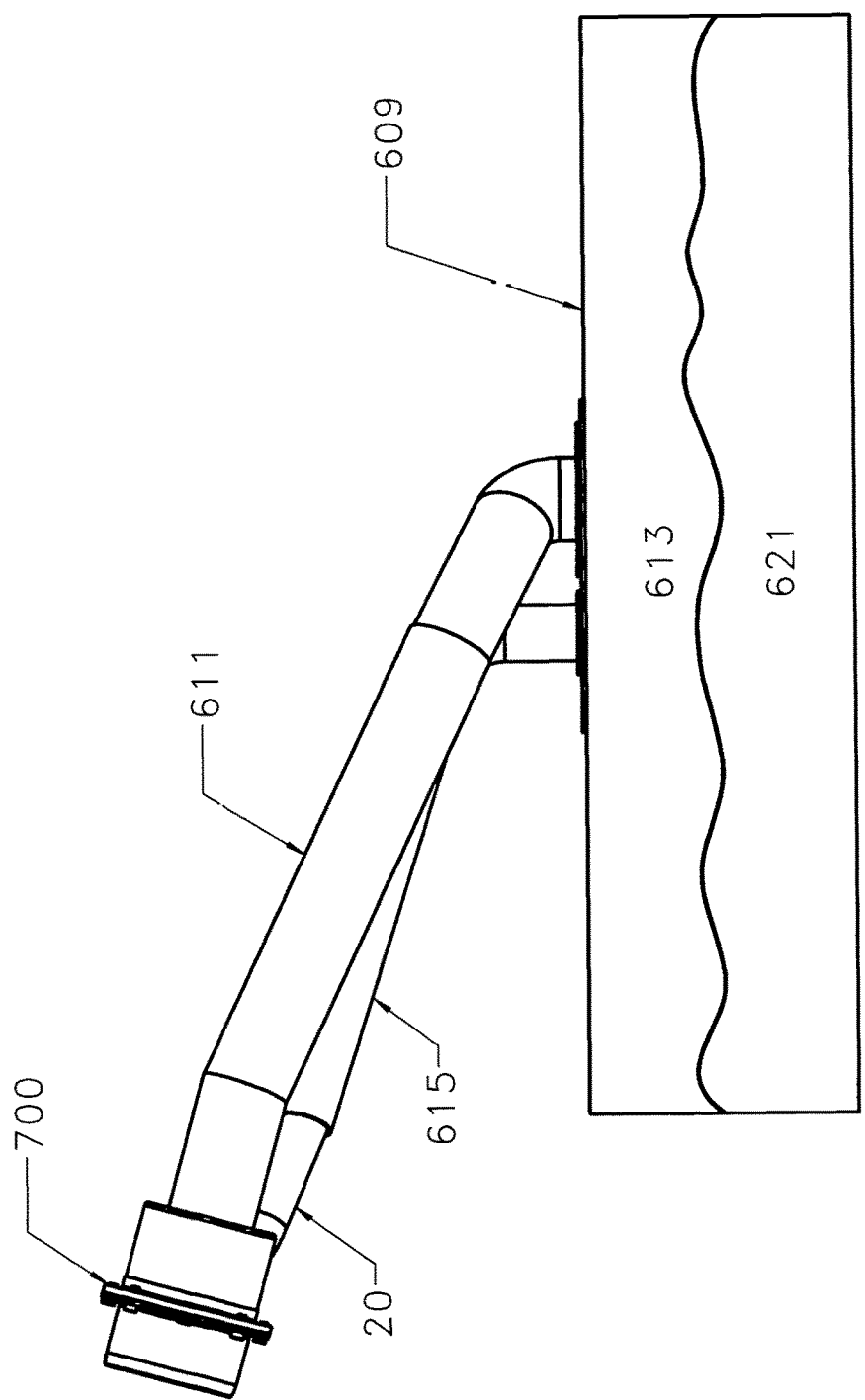
FIG. 50 shows a side view of a fuel storage tank having a coupler provided hereby attached thereto.

FIG. 50 shows a side perspective view of one exemplary fuel containment system comprising a fuel reservoir 609 having an inlet pipe 611 through which fuel is delivered to reservoir 609 and containing a liquid fuel 621 and a headspace 613, and further comprising coupler 700 whose vapor tube 20 is in effective fluid communication with the headspace 613 above the liquid fuel 621 in said reservoir by means of a tube 615, central bore 34 being in effective fluid communication with the inlet pipe 611.

In some embodiments, when male coupler 700 is engaged inside the female coupler cover and the two are pressed together by an applied force, a plurality of events occurs. Top surface 401 of inner sleeve 116 of coupler 701 contacts flat top surface 48 of sleeve 18. The applied force causes sleeve 18 to be pressed into the bore defined by wall W of coupler 700, thus causing an opening at gap 637 (FIG. 18), which creates a fluid communication path between the outlet portion 35 of the vapor tube 20 and the location of opening 637. A segment of the overall vapor communication path is defined by inner wall 161 of male adapter cover 2 and the outer surface of sleeve 18. Continued applied force causes the inner sleeve 116 and outer sleeve 316 to be pushed against pressure provided by springs 186, 286 by surfaces 48, 3 (FIGS. 7, 4) into smooth inner bore 196 of coupler cover 144, thus creating an opening at 189 (FIG. 18) through which a liquid, fuel, chemical, etc. may flow, also shown in FIG. 48. Continued application of force opens a space or passageway 627 (FIG. 44) between the outer top portion of inner sleeve 116 and the inner top portion of outer sleeve 316 in and around their juncture by virtue of inner sleeve 116 and outer sleeve 316 having been pushed to the limit of their possible travel, thus providing a fluid communication path between outlet 187 of vapor tube 172 and passage 629. Under such an arrangement, gap 637 (FIG. 18) of male coupler 700 and passage 629 of coupler 701 are in fluid communication, which also means that outlet portion 35 of vapor tube 20 and outlet portion 187 of vapor tube 172 are now in fluid communication with one another, and isolated from the passage through which liquid passes within couplers 700, 701 when connected, through the hollow interior of sleeve 18 and the interior volume of inner sleeve 116. In some embodiments, during the course of the applied force, and more or less simultaneously with the aforesaid events, top 156 of poppet 154 pushes on flat top surface 70 of poppet 100 against pressure of spring 8, thus creating opening 189 (FIG. 18), enabling fluid communication between opening 189 on coupler 700 and the opening 627 (FIG. 44) of coupler 701. Establishment of a fluid connection between the opening of opening 189 and the opening 627 means that there is fluid communication between the bottom of the central conduit 166 and the central bore 34 or end 39 of male coupler base 4. Thus, in some embodiments, insertion of the male coupler cover 2 of the finished coupler 700 into the bore of the female coupler cover 144 of coupler 701 substantially simultaneously causes a fluid communication to exist between the vapor tubes 20, 172 of each of the complementary couplers 700, 701 through a first passageway, and a fluid communication to exist between the central bore 34 of the male coupler base and the bottom of the central conduit 166 through a second passageway, which first and second passageways are separate from one another sufficiently to preclude the mixing of vapors present in vapor tubes 20, 172 and the liquid substance being transferred within couplers 700, 701. When no force is applied to sleeve 18 or inner sleeve 116, such as when a coupler provided herein is not attached to a complementary coupling, the coupler is said to be in its normally-closed position.

In some embodiments, central bore 34 (FIG. 2) of coupler 700 is connected by conventional means such as a hose, piping or any other selected conduit to the inlet pipe through which a receiving vessel such as a fuel tank is replenished with liquid, and the outlet portion 35 of the vapor tube 20 is connected by conventional means such as a hose to the headspace above the fuel in a fuel tank.

In some embodiments, coupler 701 is fitted to the bottom of a portable fuel reservoir, or alternately to a pump outlet. The outlet portion 187 of the vapor tube 172 is connected by conventional means such as a hose to be in fluid communication with the headspace above the fuel in the fuel reservoir from where the fuel to be delivered to the vehicle is stored. In some embodiments, central conduit 166 is connected by conventional means such as a hose to the bottom of the portable reservoir and thus is in fluid communication with a liquid reservoir. Conventional on-off valves of course can be employed along the path of either liquid or vapor, or both to control fluid flow when using couplers according to this disclosure.

Using such provisions, when it is deemed desirable to transfer a fluid such as when filling gasoline to a vehicle, affixing the end of coupler 701 over the open end of the coupler 700 causes the above-described events to occur, and effectively simultaneously, i.e., within about less than 1 second, permits transfer of fluids from one location to another with no loss of vapor to the atmosphere. Also, the volume of fuel delivered from the storage tank to the fuel tank on the vehicle is simultaneously compensated for by an equal exchange of headspace volume as between the two fuel storage vessels when using the provisions of this specification.

In some embodiments, vent disc 14 on the coupler 700 is spring-loaded, whose purpose is to enable ambient air to enter the fuel tank after a quantity of fuel has been removed from the fuel tank by the action of the engine's fuel pump during normal operation. In some embodiments, once the vacuum inside the fuel tank reaches a sufficient level that spring 12 can no longer hold vent disc 14 in its seated position, the vent disc is drawn away from retainer ring 16, and enables ambient air to enter the tank to compensate for the loss of fuel or other cause of vacuum in the tank, including decreases in ambient temperature. In addition, vent disc 14 includes hole 15 in its surface, which orifice enables excess pressure which may build up in the tank, owing to increases in temperature or other causes to be automatically vented to the ambient atmosphere.

In some embodiments, a bore can be considered as being synonymous with a conduit with respect to the liquid passage through a coupler. In some embodiments, an element as taught herein can be effectively spring biased without directly contacting a spring itself, such as sleeve 18 is spring biased by virtue of its being in effective mechanical contact with poppet 100, which itself is spring biased. The seal between sleeve 116 and the periphery of poppet 154 is in some embodiments a spring-biased seal.

A prior art coupling bearing some resemblance to those of this disclosure is shown and described in reference to FIGS. 46A-46F of U.S. Pat. No. 7,798,184. However, such prior art couplings suffer in that they contain a dead space 911 as more clearly shown herein in FIG. 51. Dead space 911 in the '184 patent is a location that fuel can occupy that does not make its way into the receiving vessel, on-board fuel tank, etc. When such prior art couplers are disconnected from one another, the volume of fuel present in dead space 911 is lost to the surroundings such as by drippage by gravity. Dead space 911 also causes small amounts of un-necessary turbulence in fluid flow when such prior art couplers are connected to one another.

Figure 51:
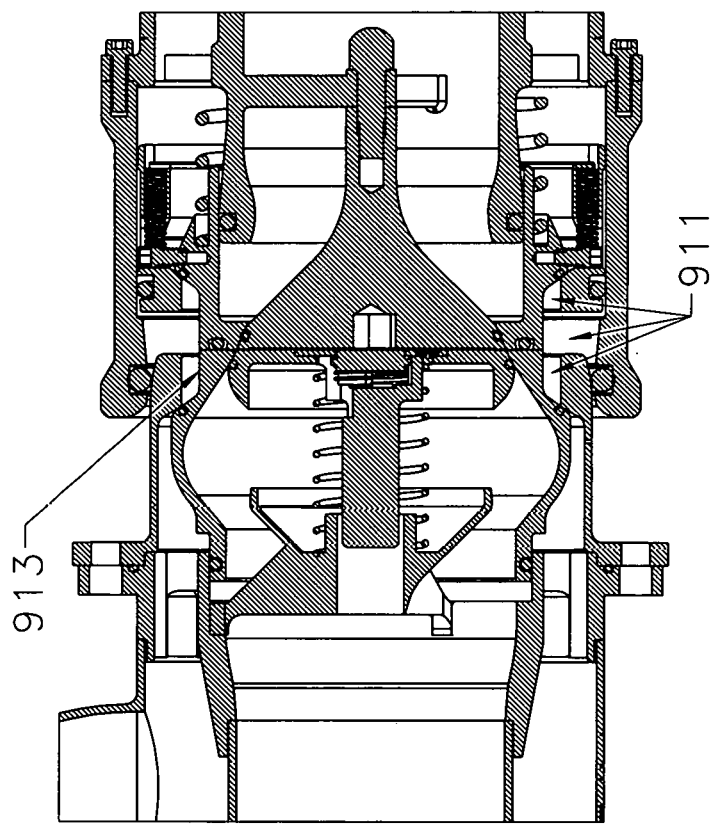
FIG. 51 shows a side cutaway view of prior art couplers when partially engaged.
Figure 52:
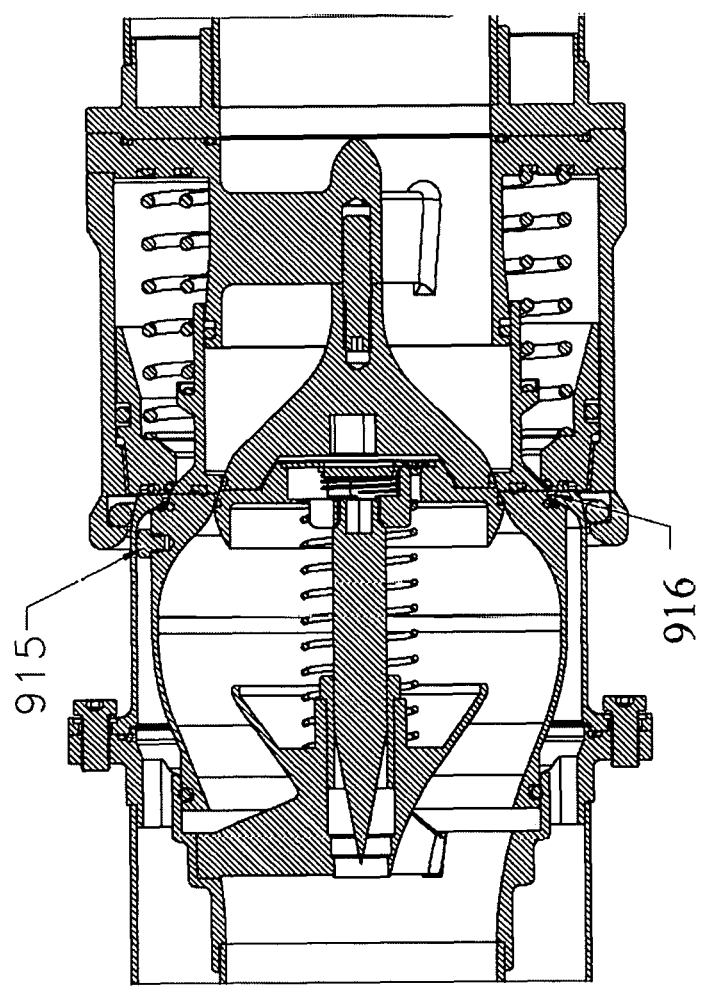
FIG. 52 shows a side cutaway view of couplers provided herein when partially engaged.
Figure 53:
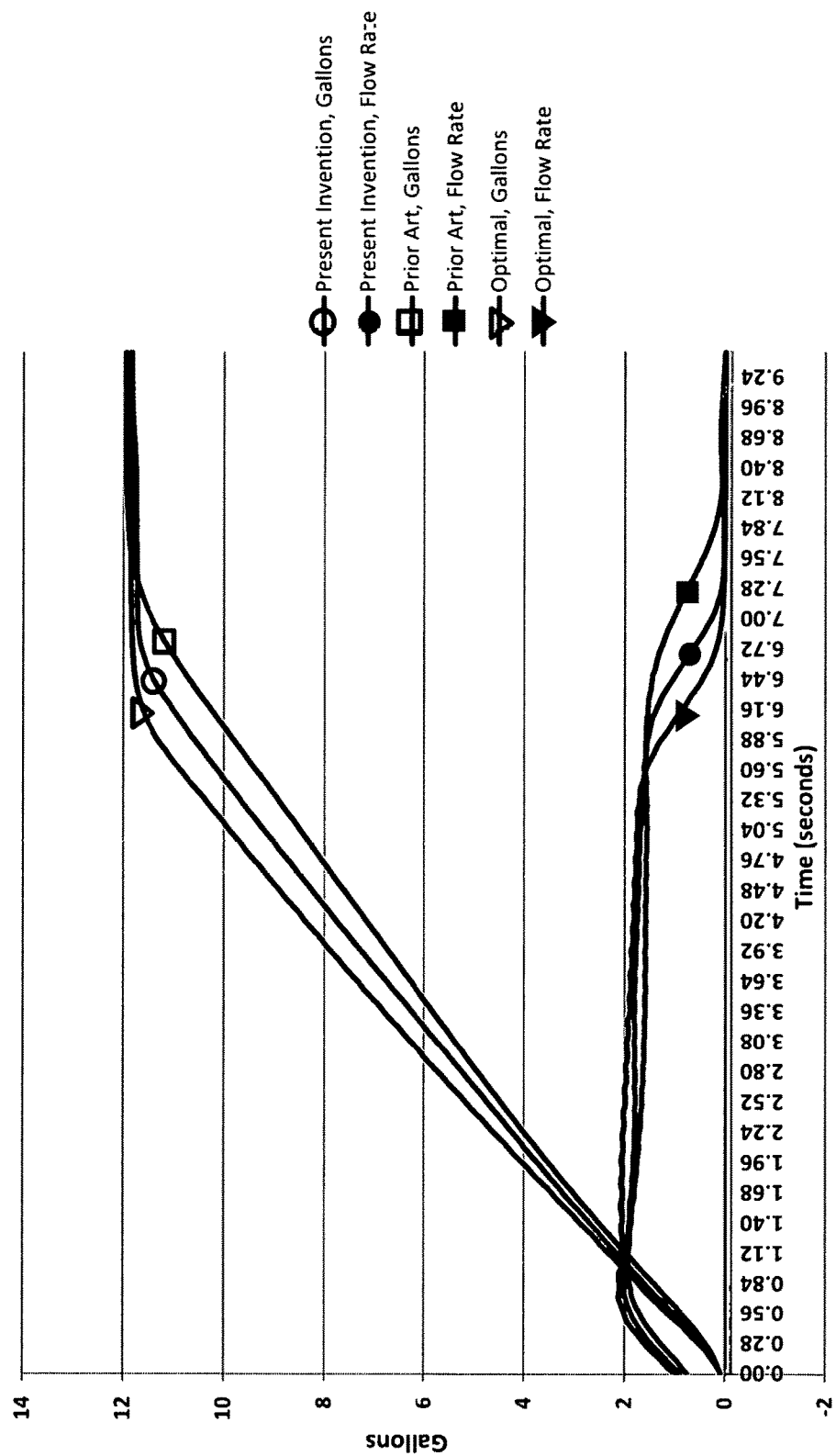
FIG. 53 is a graphical data representation of performance of couplers of this invention with that of prior art couplers.
Figure 55:
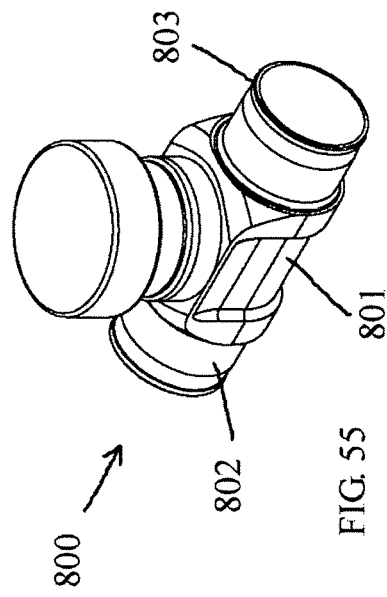
FIG. 55 is a perspective view of a two-way pressure equilibrium valve useful in accordance with some embodiments of this disclosure.
Figure 57:
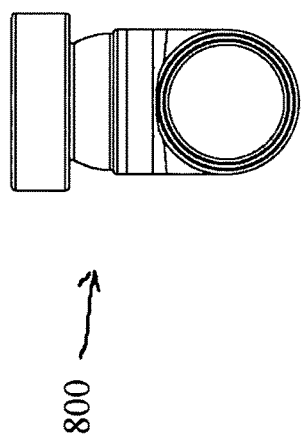
FIG. 57 is an end view of a two-way pressure equilibrium valve useful in accordance with some embodiments this disclosure.

The present invention however has no such dead space associated with prior art couplers. One feature of couplers according to some embodiments of this disclosure is that bushing 915 is present at the upper portion of sleeve 18 (FIG. 52), which is different in location from its counterpart in the prior art which was at location 913 (FIG. 51). Bushing 915 in FIG. 52 functions to center sleeve 18 concentrically with male coupler cover 2 while remaining slidably disposed. It is noted from FIG. 52 that couplers according to this disclosure provide for essentially zero dead space volume at 916 in FIG. 52, as compared with dead space volume 911 of prior art couplers shown in FIG. 51.

Moreover, coupler 701 in the present disclosure includes as components of the automatically-opening upon engagement vapor vent passageway inner sleeve 116 and outer sleeve 316. According to prior art devices such elements were themselves configured to be maintained in position with respect to one another by springs commonly contacting each element. In contrast, the present disclosure provides springs 186, 286 acting on each element 116, 316 independently of one another, rendering variability in selectivity of spring pressures not provided for in prior art devices. Selection of a suitable balance of spring pressures results in quicker closure upon detachment of couplers of this disclosure, which when combined with the elimination of dead space 911 in prior art devices results in typical loss volumes of fuel of no more than 20 milliliters, even when a fuel cell is "packed", compared with prior art devices' loss on the order of about 50 milliliters or more per detachment. Often, when fueling, a technician will charge a fuel containment vessel 617 full of fuel into the vehicle's on-board reservoir, then have a second full fuel containment vessel 617 at hand for further or subsequent charging the vehicle, and add more fuel in order to "pack the fuel cell" full of fuel. Packing the fuel cell is understood by those of ordinary skill in this art to mean overfilling the vehicle's on-board fuel tank to the point where fuel comes back up through the vent tube of the remote reservoir. Such action provides the vehicle a little more fuel for the race. When the fuel cell is not "packed" per the foregoing, spillage is nominal, however when the fuel cell is "packed", using couplers of the present invention, a maximum spillage amount of no greater than 20 milliliters is achieved. In some embodiments inner spring 186 is 15.75 centimeters long at rest and has a spring pressure of about sixty Newtons when compressed to its installed length of 5.1 centimeters. In some embodiments outer spring 286 is sixteen centimeters long at rest and has a spring pressure of about fifty-five Newtons when compressed to its installed length of 6.1 centimeters. However, when springs are specified herein it is appreciated by those skilled in the art apprised of the instant disclosure that these values are not set in stone, and that different springs with different spring forces and free lengths can be employed provided the function as herein described is achieved.

The features of selectability of two different springs as mentioned above adds to synergistic function of couplers of the present disclosure, when viewed in conjunction with the elimination of dead space volume 911. Spillage or loss of liquid fuel is dependent on two main factors: 1) dead space volume; and 2) closure speed of the liquid passageway in couplers provided herein. In a coupler 701 provided herein, the dead space volume is essentially zero due to the configuration of inner and outer sleeves 116, 316 and the face of coupler 701 is a flush surface.

The relative characteristics of inner spring 186, outer spring 286, and spring 8 control the opening and closing events or motion of components they bias when couplers according to this disclosure are coupled/uncoupled. For some embodiments as concerns springs used in couplers provided hereby, spring force is necessary for three functions. The first function is to apply a force to all components to that the couplers are normally closed when no force is applied to the moveable components of a coupler. A second function is to apply enough force to properly seat all seals while in the closed position thereby preventing any leakage of fuel. A third function is to quickly close both couplers upon their detachment from one another, so as to preclude spillage or fuel waste during and immediately after their detachment or disengagement from one another. If the force of the springs is too little, the couplers won't overcome o-ring friction to close quickly enough and may not close enough at all. Moreover, the force on the seals may not be adequate for sealing. Thus, springs used herein are of sufficient force to overcome o-ring friction and provide seals present the ability to form a closed seal. If spring force is too large, engagement of the couplers to one another becomes difficult because an excessively strong force must be applied to the couplers. In some embodiments, inner spring 186 and outer spring 286 work independently from one another. In some embodiments these are selected to provide proper sealing and sliding motion to the respective components upon which they exert their force. In some embodiments outer sleeve 316 limits the movement of inner sleeve 116, which inner sleeve 116 in turn is limited by poppet 154. Accordingly, the force at o-ring 162 seal on poppet 154 has a component that derives from the force of springs 186, 286 acting on inner sleeve 116 and outer sleeve 316 respectively. Although springs 186, 286 work independently from one another, they both must be overcome in order to engage the couplers 700, 701 to one another, there is a fine balance of providing each spring to carry out its function while affording an ergonomic feel and function to the couplers.

Due to the orientation of inner and outer springs 186, 286, one potential issue that arises is that of binding of the springs. In some embodiments inner spring 186 is wound closely against the interior wall of inner sleeve 116, and both springs are seated in slots in billet body 168. In some embodiments springs 186, 286 are wound in opposite directions, with one being a right-handed wind and the other being a left-handed wind, to prevent binding. In some embodiments, the order in which the components of the couplers open and close is not determined by springs, rather is determined by the mechanical limits imposed by the configuration and features of the moveable components of couplers 700, 701.

Another feature of couplers according to the present disclosure is greater travel of poppet 100 of coupler 700 as compared with couplers of the prior art. In couplers of prior art such as those of U.S. Pat. No. 7,798,184, the movement of the poppet was restricted by the dimensions of the distance that the components present in adapter 701 on the remote reservoir was able to be pressed in by vehicle-side adapter 700 upon engagement of the couplers after initial contact of the poppet faces with one another. In some embodiments of the present invention, this distance is 25% greater than the prior art. In other embodiments it is 30% greater than in the prior art. The increased poppet movement or travel of couplers provided by the present invention during the process of engaging the couplers with one another is taken advantage of by 1) providing for the poppet to be finally disposed in a region of wider cross-sectional flow area than the prior art due to increased poppet movement; and 2) configuration of the inner wall of sleeve 18 about the periphery of poppet 100, while maintaining functional synergism with all other components in the multiple functions described herein and additionally providing faster liquid flow than prior art devices.

Another feature of couplers according to the present disclosure different from prior art devices is that in prior art devices, is that according to the present disclosure the vent elements 116, 316 are configured sufficiently that the vapor vent passage opens immediately upon the slightest indulgence of coupling couplers 700, 701 of this disclosure. In similar prior art devices the vent passageway is not open until after the couplers are substantially completely engaged with one another, at least two centimeters of engagement being required in prior art devices, whereas according the present disclosure vent passageways are open upon less than five millimeters of engagement between couplers 700, 701 Substantial immediate opening of the vent passageway in couplers made according to the present disclosure prior to the opening of the liquid or fuel passageway permits the vent to breathe during essentially every degree of coupling with one another for the couplers herein provided.

The vent timing features of this disclosure have also been found to provide further benefit by enabling simple manual purging/draining of the vent tube elements 172, 623 (FIG. 49) after a portion or more of liquid fuel 621 has been transferred from fuel containment vessel 617 to a motorized vehicle, and vessel 617 is returned to the orientation of FIG. 49. Under some conditions, liquid fuel can become present in vent tube elements 172, 623. Prior art devices required opening the liquid fuel passageway in couplers analogous to 701 before venting could occur. During slight engagement, liquid fuel from vent tube 172 flows out of gap 629 and into the vehicle-side through gap 637 and eventually out of vent tube 20, when vent tube 20 is facing downward.

The foregoing aspects and features of couplers as provided herein yield superior performance over similar couplers found in the prior art as shown by the test results provided below in Table I:

TABLE I

Flow Rate Analysis

|  | Ideal | Prior Art Couplers | Current Couplers |
| --- | --- | --- | --- |
| Flow Rate (gallons/sec.) | 1.910 | 1.637 | 1.766 |
| % decrease from Ideal | 0 | 14.29% | 7.54% |
| % increase over Prior Art | 16.7% | 0 | 7.9% |
| Time from 11.5 to 0.5 gals (sec.) | 5.76 sec. | 6.72 sec. | 6.23 sec. |
| Time Difference between instant couplers v. Prior Art | 0.96 sec | 0 | 0.49 sec |

The data for Table I was generated by filling a standard 58" dump can (from Richardson Racing Products of Concord, N.C.) used on circuit tracks and NASCAR events to 12.0 gallons of fuel, discharging the fuel contained therein using couplers of the prior art U.S. Pat. No. 7,798,184 into a fuel tank, and repeating the process for couplers made according to the instant disclosure. The amount of time necessary to vacate the dump can completely was measured for each of the sets of couplers. The fuel for each test was the same E-90 pump fuel (Sunoco) containing 10% ethanol, and the tests were conducted at 70 deg. F. The diameters of central conduit 34 and central conduit 166 for each of the pairs of couplings tested were identical, as were vapor tubes 20, 172 and all hoses and other conduits employed. As evident from Table I, couplers according to this disclosure are capable of discharging 11 gallons of fuel into the motorized vehicle 0.49 seconds faster than couplers of prior art. Given that racing vehicles travel at rates exceeding 250 ft./sec., one half of a second saved in refueling time translates to several car lengths of distance. Given that some races are won by a few car lengths of distance, the use of couplers provided by the present disclosure over prior art devices can make significant time reduction contributions during re-fueling operations and even enable a team to win a race compared to those using devices of prior art, all else being equal. For multiple pit stop races which are common, these time gains multiply one another.

Figure 54:
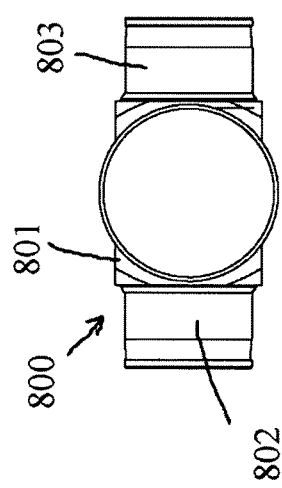
FIG. 54 is an overhead view of a two-way pressure equilibrium valve useful in accordance with some embodiments of this disclosure.
Figure 56:
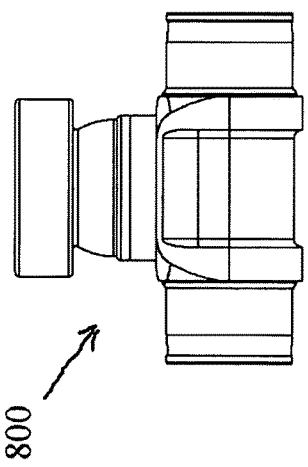
FIG. 56 is a side view of a two-way pressure equilibrium valve useful in accordance with some embodiments of this disclosure.

As concerns the remote fueling setup depicted in FIG. 49 which comprises vessel 617, coupler 701, and vapor tube 172, such combination is useful for re-fueling motorized vehicles equipped with a coupler 700 operatively attached to a vehicles fuel tank. However, owing to variances in ambient temperature, the temperature of the fuel and headspace aboard the motorized vehicle, and the temperature of fuel present in vessel 617, it often occurs that the pressure within vapor tube 172 can be either greater than, or less than ambient atmospheric pressure. Excessive pressure within vapor tube 172 can lead to increased spillage of fuel, whilst reduced pressure within vapor tube 172 can result in slower refueling time, among other problems readily recognized and known by those skilled in this art, which include those who have employed prior art devices. To remedy the shortcomings of the prior art, a two-way pressure equilibrium valve 800 is provided herein as depicted in FIG. 49. However, the present disclosure provides for such equilibrium valve 800 to be disposed at any suitable location along vapor tube 172. FIG. 54 is an overhead view of a two-way pressure equilibrium valve 800 useful in accordance with some embodiments of this disclosure, illustrating the respective locations of billet tee 801, first vent hose connector 802 and second vent hose connector 803. These elements are also shown for perspective in the side and end views of same in FIGS. 56, 57, respectively. An exploded view of a two-way pressure equilibrium valve 800 is illustrated in FIG. 58.

Figure 58:
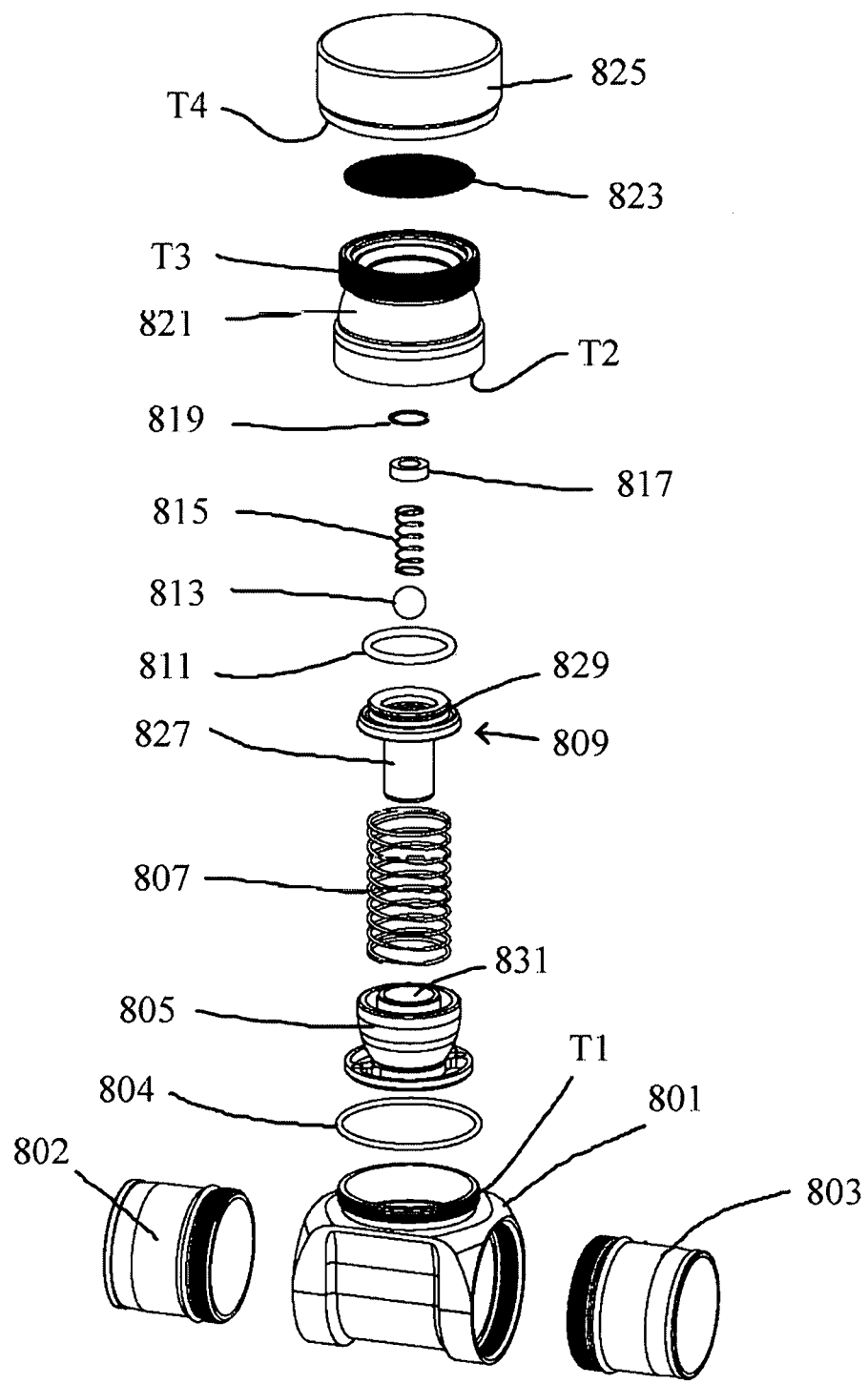
FIG. 58 is an exploded view of a two-way pressure equilibrium valve useful in accordance with some embodiments of this disclosure, showing its component.

In FIG. 58 are shown billet tee 801 and first and second vent hose connectors 801, 802. First and second vent hose connectors 802, 803 can be attached to billet tee by any conventional means, including complementary threads at the juncture of each, by welding, or by all three of these elements being of unitary construction, such as die-cast metallic elements or alloys including stainless steels, zinc, and any selected aluminum alloy. The central top portion of billet tee 801 is configured to receive a poppet guide 805 in a sealing engagement therewith by virtue of cap o-ring 804 or any functionally-equivalent seal disposed therebetween. Poppet guide 805 includes a central bore 831 disposed through it longitudinally and to any suitable depth enabling it to receive the tubular stem 827 portion of vacuum poppet 809, i.e., stem 827 of vacuum poppet 809 is inserted into the bore of poppet guide 805 in a slidingly-engageable fashion. Poppet guide 805 is configured to feature a land or equivalent surface that receives one end of vacuum spring 807 and enables it to be disposed between poppet guide 805 and vacuum poppet 809 sufficiently to mechanically bias vacuum poppet 809 away from poppet guide 805 in its normal installed position with sufficient force as may be pre-selected so as to not enable vacuum poppet 809 to move towards poppet guide 805 until a pressure exists within the interior of billet tee 801 that is sufficiently lower than atmospheric pressure to overcome the force exerted by vacuum spring 807 when the combination of FIG. 49 is in field use. Vacuum poppet 809 has a head portion that includes a groove disposed about the upper portion of its head, as shown in subsequent figures, that is configured to receive vacuum poppet o-ring 811 and maintain it in position thereon by interference fit as such fits are well known and used with o-rings. Also depicted in FIG. 58 are pressure relief check ball 813, poppet check ball spring 815, spring seat 817, retainer 817, cap 821, screen 823 and flame arrestor cap 825. In some embodiments, billet tee 801 comprises threads T1 disposed about a nipple present thereon as shown, akin to the threads T3 present about the upper rim of cap 821. In some embodiments the threads T1 are complementary to threads present on the inside surface near or at the bottom portions of cap 821. In some embodiments the threads T3 are complementary to threads present on the inside surface near or at the bottom portions of flame arrestor cap 825. However, any conventional means of attachment of these components to one another can be employed, threads being helpful for disassembly and cleaning. Welds and press-fits or interference fits, crimping, etc. are also within the scope of this disclosure.

Figure 59:
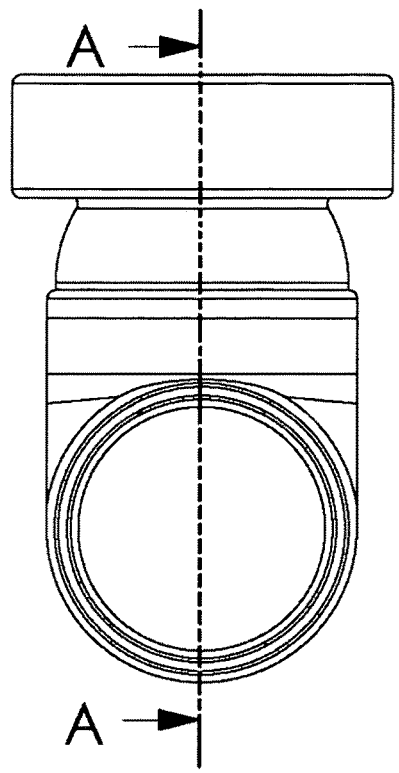
FIG. 59 is an end view of a two-way pressure equilibrium valve useful in accordance with some embodiments this disclosure, depicting the Section A-A further described in relation to FIGS. 60-62.
Figure 60:
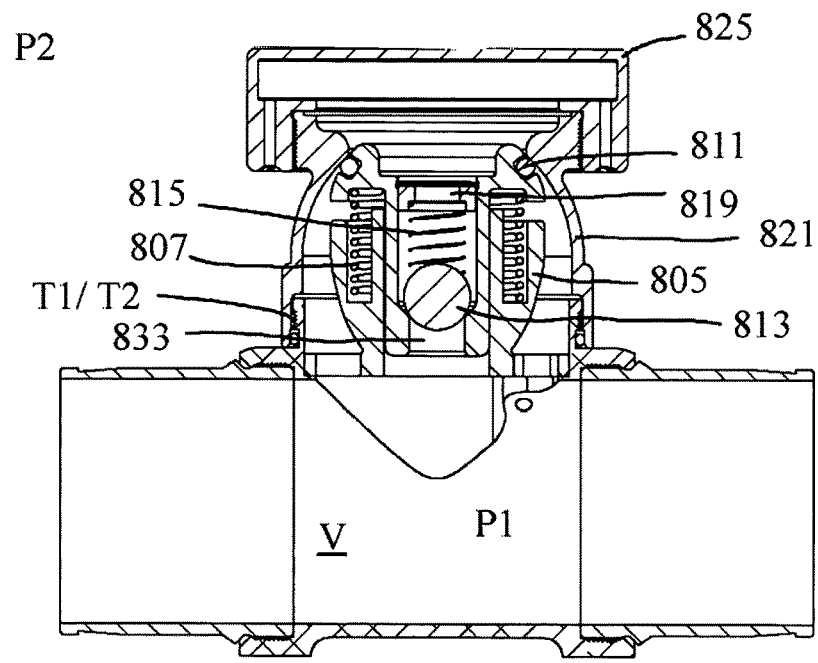
FIG. 60 is a cutaway view of the Section A-A defined in FIG. 59 illustrating a two-way pressure equilibrium valve useful in accordance with some embodiments this disclosure having its components configured in a pressure equilibrium position.
Figure 61:
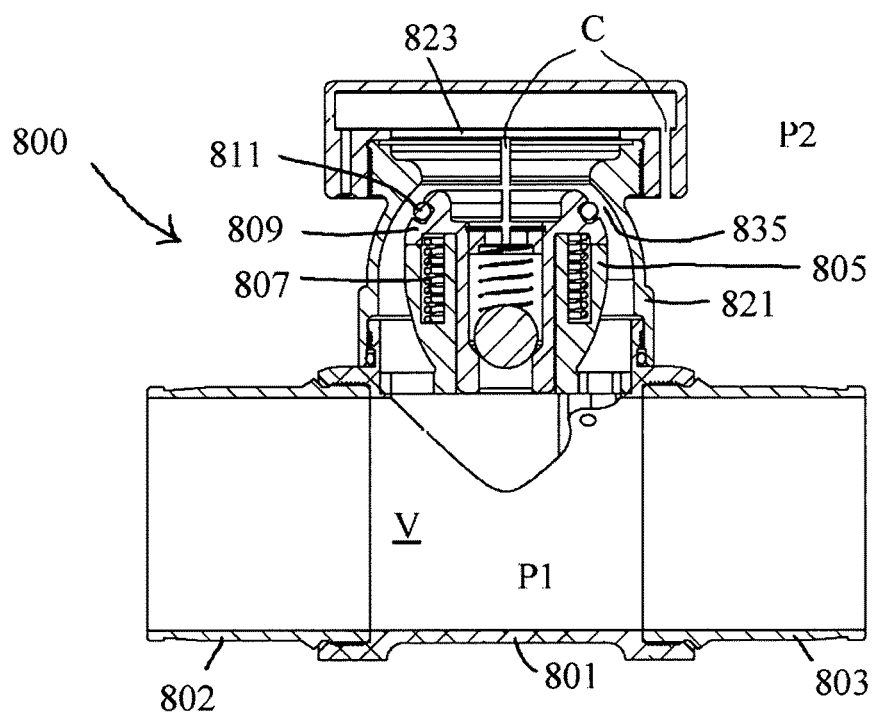
FIG. 61 is a cutaway view of the Section A-A defined in FIG. 59 illustrating a two-way pressure equilibrium valve useful in accordance with some embodiments this disclosure having its components configured in an ambient air admission position.
Figure 62:
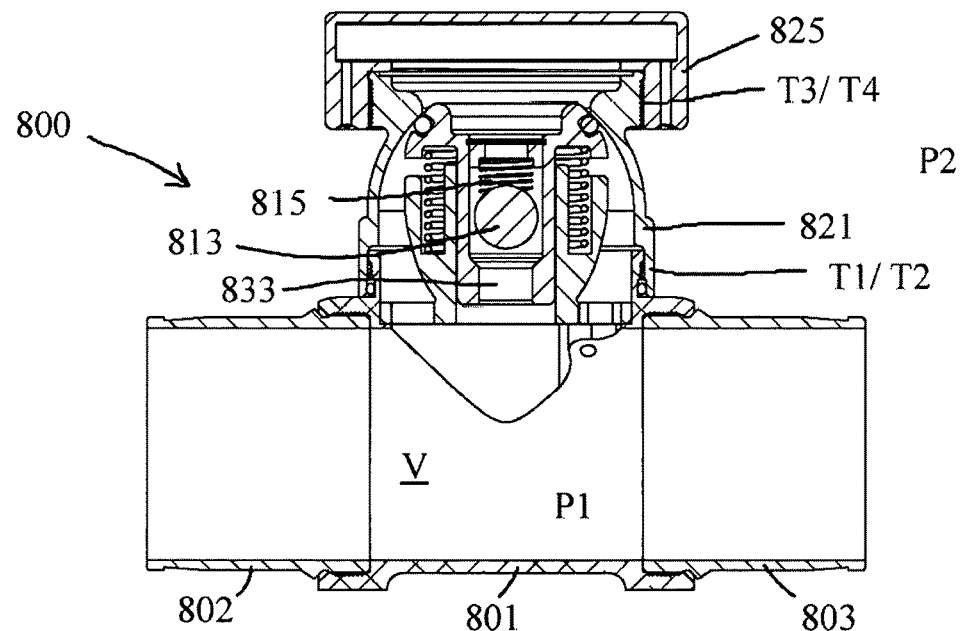
FIG. 62 is a cutaway view of the Section A-A defined in FIG. 59 illustrating a two-way pressure equilibrium valve useful in accordance with some embodiments this disclosure having its components configured in an internal pressure relieving position.

FIG. 59 is an end view of a two-way pressure equilibrium valve 800 useful in accordance with some embodiments this disclosure, depicting the Section A-A further described in relation to FIGS. 60-62. In FIG. 60 is a cutaway view through the Section A-A shown in FIG. 59 illustrating a two-way pressure equilibrium valve 800 in a neutral position. That is, given an ambient pressure of P2 which is substantially one atmosphere in the surroundings external to valve 800, and given a pressure P1 extant within the volume V internal to billet tee 801 and hence also within vapor tube 172 in FIG. 49, the springs 807, 815 are selected to be of sufficient lengths and force constants to maintain both check ball 813 and poppet o-ring 811 seated in their locations sufficiently to prevent any fluid communication between volume V and the external surroundings when the pressure differential between P1 and P2 is any pre-selected differential. In some embodiments the pressure differential or difference between P1 and P2 is and amount in the range of between 10 torr and 200 torr, including all pressures therebetween and all ranges of pressures therebetween. FIG. 60 further includes illustration of the various components of pressure equilibrium valve 800, including flame arrestor cap 825, cap 821, vacuum poppet o-ring 811, retainer 819, poppet guide 805, pressure relief check ball 813, threads T1 and T2 by which cap 821 is attached to billet tee 801, vacuum spring 807, poppet check ball spring 815, and flame arrestor cap 825. Also shown is passage 833 which is centrally located beneath the seat of pressure relief check ball 813 present within vacuum poppet 809 and is contoured to enable check ball 813 to sealingly reside thereon when acted upon by the force exerted by spring 815, but yet comprises an opening which enables fluid communication to exist between volume V and the external surroundings when the pressure P1 is sufficient with respect to P2 to overcome the force of spring 815 to enable relief of P1 as depicted in FIG. 62.

FIG. 61 is a cutaway view of the Section A-A defined in FIG. 59 illustrating a two-way pressure equilibrium valve 800 useful in accordance with some embodiments this disclosure having its components configured in an ambient air admission position. This is evident by virtue of the external pressure P2 being greater than pressure P1 by an amount at least sufficient to overcome the force exerted by vacuum spring 807 and compressing it, as shown. In this depiction, vacuum poppet 809 has been forced downward by external pressure P2 exceeding that of P1 so that its head contacts the upper surface of poppet guide 805, which acts as a stop. By such downward movement of vacuum poppet 809, vacuum poppet o-ring 811 disengages from the inner surface of cap 821, thus opening up passage 835, through which external air enters the valve 800 and is admitted into volume V until the combined effects of pressures P1, P2, and biasing spring 807 once again cause the components of equilibrium valve 800 to return to the configuration of FIG. 60. Fluid communication between the external surroundings and volume V is in some embodiments provided by channels C as shown in FIG. 61, however the exact location, configuration and dimensions of such channels are not critical in all embodiments, the main proviso being that such a passageway from the external surroundings to the internal volume V is provided that is selectively openable and closeable, and controlled by a check ball and poppet and their associated springs as described herein.

FIG. 62 is a cutaway view of the Section A-A defined in FIG. 59 illustrating a two-way pressure equilibrium valve 800 useful in accordance with some embodiments this disclosure having its components configured in an internal pressure relieving position. This is evident by virtue of the external pressure P2 being less than pressure P1 by an amount at least sufficient to overcome the force exerted by poppet check valve spring 815 and compressing it, as shown. In this depiction, vacuum poppet 809 remains in its same position as depicted in FIG. 60, but pressure relief check ball 813 has been forced upward by external pressure P1 exceeding that of P2 so that ball 813 is lifted from its seat thus opening up passage 833, through which vapor present in volume V air exits or escapes from volume V and hence from within vapor tube 172 and escapes to the surrounding atmosphere until the combined effects of pressures P1, P2, and biasing spring 815 once again cause the components of equilibrium valve 800 to return to the configuration of FIG. 60. By the features and combinations and their combined synergisms described herein, the provisions of the present invention provide superior transfer of liquid fuels between storage reservoirs with minimal loss due to spillage and faster and safer than prior art devices and methods, among other advantages readily recognizable by those skilled in this art.

Consideration must be given to the fact that although various aspects of the invention have been described and disclosed in relation to certain embodiments, obvious equivalent modifications and alterations of components and their cooperative function as taught herein may become apparent to one of ordinary skill in this art after reading and understanding this specification and the claims appended hereto. Such modifications and alterations include substitution of functionally-equivalent geometries of components described herein, such as for example the use of a rectangular, ovoid, or other-shaped sleeves 18, 116, 316 and bases and other components complementary thereto in terms of any function or synergism provided herein. In some embodiments, central conduit 166 and central bore 34 serve the same general function, as each comprise a portion of a conduit through which a liquid is intended to flow through couplers 700, 701.

Although this invention has been described and disclosed in relation to certain preferred embodiments, equivalent modifications and alterations of components and combinations may become apparent to persons of ordinary skill in this art after reading and understanding the teachings of this specification, drawings, and the claims appended hereto. The present disclosure includes subject matter defined by any combinations of any one or more of the features provided in this disclosure with any one or more of any other features provided in this disclosure. These combinations include the incorporation of the features and/or limitations of any dependent claim, singly or in combination with features and/or limitations of any one or more of the other dependent claims, with features and/or limitations of any one or more of the independent claims, with the remaining dependent claims in their original text being read and applied to any independent claims so modified. These combinations also include combination of the features and/or limitations of one or more of the independent claims with features and/or limitations of another independent claims to arrive at a modified independent claim, with the remaining dependent claims in their original text or as modified per the foregoing, being read and applied to any independent claim so modified. The present invention disclosed and claimed encompasses modifications and alterations that achieve substantially the same result as herein taught using substantially the same or similar structures, being limited only by the scope of the claims which follow.

What is claimed is:

1. A portable device useful for charging a fuel to an on-board fuel tank of a motorized vehicle, comprising:
   I) a coupler comprising:
      a) a base having a central bore and a shrouding enclosure disposed about said central bore, said shrouding enclosure comprising an interior volume and having an outlet tube attached thereto;
      b) a cover having an inner wall, attached to said base said inner wall of said cover comprising a tapered bore;
      c) a first quasi-cylindrical sleeve slidably disposed within said cover,
      said first quasi-cylindrical sleeve having a top surface, an interior wall surface, an exterior wall surface, a hollow interior, an open bottom, and an open top, said open top having a first seat and a second seat;
      d) a second quasi-cylindrical sleeve slidably disposed within said cover,
      said second quasi-cylindrical sleeve having a top surface, an interior wall surface, an exterior wall surface, a hollow interior, an open bottom, and an open top, said open top having a third seat,
         said first quasi-cylindrical sleeve being slidably disposed within the hollow interior of said second quasi-cylindrical sleeve, and wherein said second seat at the top of said first quasi-cylindrical sleeve is disposed to sealingly-engage said third seat;
      e) a poppet within said cover centrally located with respect to said first seat, aid poppet having a top surface and a periphery, said poppet being configured and disposed to provide a selectively-engageable seal with said first seat,
         said seal between said first seat and said periphery being maintained by said first sleeve being mechanically biased towards a normally-closed position with respect to the first quasi-cylindrical sleeve by means of a first spring,
         said seal between said second seat and said third seat being maintained by said second quasi-cylindrical sleeve being mechanically biased towards a normally-closed position with respect to said first quasi-cylindrical sleeve by means of a second spring,
         said first and second sleeves being configured and disposed sufficiently to enable, upon application of force to said first and second sleeves against the force of said first and second springs, the first opening of a first passage suitable for flow of vapor therethrough, and the subsequent opening of a second passage that is separate and distinct from said first passage suitable for flow of a liquid therethrough, said first passage being bounded by said exterior wall surface of said first quasi-cylindrical sleeve and the interior wall surface of said second quasi-cylindrical sleeve, said second passage being through said interior of said first quasi-cylindrical sleeve;
   II) a fuel reservoir having an outlet that is in fluid communication with said central bore;
   III) a vapor tube in fluid communication with both of said fuel reservoir and said passage suitable for flow of vapor therethrough; and IV) a two-way pressure equilibrium valve present at any location along said vapor tube, said pressure equilibrium valve being configured to selectively admit air from the external surroundings into said vapor tube and discharge excess pressure present in said fuel reservoir, in response to changing conditions in the environment external to said device.

2. A device according to claim 1 wherein said central bore includes a transition between a first diameter present in said central bore and a dimension of said interior wall surface of said second quasi-cylindrical sleeve, said transition comprising a tapered segment.

3. A device according to claim 1, wherein said poppet is stationary.

4. A device according to claim 1 including space adjacent to said exterior wall surface of said first quasi-cylindrical sleeve, wherein said space is in fluid communication with said interior volume of said enclosure.

5. A device according to claim 1 wherein said base further includes a central hub, and wherein said first quasi-cylindrical sleeve is slidably disposed about said hub within said cover.

6. A device according to claim 1 wherein said exterior wall surface of said second quasi-cylindrical sleeve is slidably disposed within said cover by the exterior wall of said second quasi-cylindrical sleeve being guided by said inner wall of said cover.

7. A device according to claim 1 wherein said top surfaces of said first quasi-cylindrical sleeve, said second quasi-cylindrical sleeve, and said poppet each have a portion which are co-planar with one another.

8. A device according to claim 1 wherein at least a portion of said first passage is concentrically disposed about said second passage.

9. A device according to claim 8 wherein said sleeves are spring-biased towards a closed position with respect to said periphery of said poppet and to one another.

* * * * *